(12) United States Patent
Yonezawa et al.

(10) Patent No.: US 7,856,137 B2
(45) Date of Patent: Dec. 21, 2010

(54) APPARATUS AND METHOD FOR VERIFYING IMAGE BY COMPARISON WITH TEMPLATE IMAGE

(75) Inventors: Toru Yonezawa, Hyogo (JP); Hirofumi Kameyama, Hyogo (JP)

(73) Assignee: Glory Ltd., Himeji-shi (JP)

( * ) Notice: Subject to any disclaimer, the term of this patent is extended or adjusted under 35 U.S.C. 154(b) by 1014 days.

(21) Appl. No.: 11/572,070

(22) PCT Filed: Jun. 22, 2005

(86) PCT No.: PCT/JP2005/011465

§ 371 (c)(1),
(2), (4) Date: Jan. 12, 2007

(87) PCT Pub. No.: WO2006/006356

PCT Pub. Date: Jan. 19, 2006

(65) Prior Publication Data

US 2007/0165936 A1 Jul. 19, 2007

(30) Foreign Application Priority Data

Jul. 13, 2004 (JP) ............................. 2004-206169
Jul. 13, 2004 (JP) ............................. 2004-206170

(51) Int. Cl.
*G06K 9/00* (2006.01)
*G06K 9/62* (2006.01)
*G07D 5/00* (2006.01)

(52) U.S. Cl. ..................... 382/136; 382/209; 194/328
(58) Field of Classification Search .................. 382/136
See application file for complete search history.

(56) References Cited

U.S. PATENT DOCUMENTS

| 4,899,392 | A | * | 2/1990 | Merton ..................... 382/136 |
| 5,133,019 | A | * | 7/1992 | Merton et al. ............... 382/136 |
| 5,220,614 | A | * | 6/1993 | Crain ........................ 382/136 |
| 5,224,176 | A | * | 6/1993 | Crain ........................ 382/136 |
| 5,236,074 | A | * | 8/1993 | Gotaas ....................... 194/331 |
| 5,494,147 | A | * | 2/1996 | Takahashi et al. ........... 194/328 |

(Continued)

FOREIGN PATENT DOCUMENTS

EP 0 798 669 A2 10/1997

(Continued)

OTHER PUBLICATIONS

Minoru Fukumi, "Rotation-Invariant Neural Pattern Recognition System with Application to Coin Recognition", IEEE Transactions on Neural Networks, vol. 3, No. 2 (1992), XP000262362, pp. 272-279.

*Primary Examiner*—Bhavesh M Mehta
*Assistant Examiner*—David P Rashid
(74) *Attorney, Agent, or Firm*—Foley & Lardner LLP

(57) ABSTRACT

A correlation value image is generated from an input image and a template image, and separated into a positive correlation value image and a negative correlation value image. The template image is separated into a positive template image and a negative template image. A plurality of positive-negative-separated correlation images are generated by combining the positive correlation value image and the negative correlation value image and the positive template image and the negative template image. A polar-coordinates-converted input image and a polar-coordinates-converted template image are employed as the input image and the template image, respectively.

33 Claims, 30 Drawing Sheets

U.S. PATENT DOCUMENTS

| | | | |
|---|---|---|---|
| 5,538,123 A * | 7/1996 | Tsuji | 194/303 |
| 5,839,563 A * | 11/1998 | Takahashi | 194/328 |
| 6,499,581 B2 * | 12/2002 | Yoshida et al. | 194/318 |
| 6,685,000 B2 * | 2/2004 | Sugata et al. | 194/328 |
| 6,688,449 B1 * | 2/2004 | Yamagishi | 194/328 |
| 2003/0111316 A1 * | 6/2003 | Winters | 194/302 |
| 2004/0003981 A1 * | 1/2004 | Lee | 194/328 |

FOREIGN PATENT DOCUMENTS

| | | | |
|---|---|---|---|
| JP | 08212414 A * | 8/1996 | |
| JP | 2000-322579 A | 11/2000 | |
| JP | 2003-187289 A | 7/2003 | |

* cited by examiner

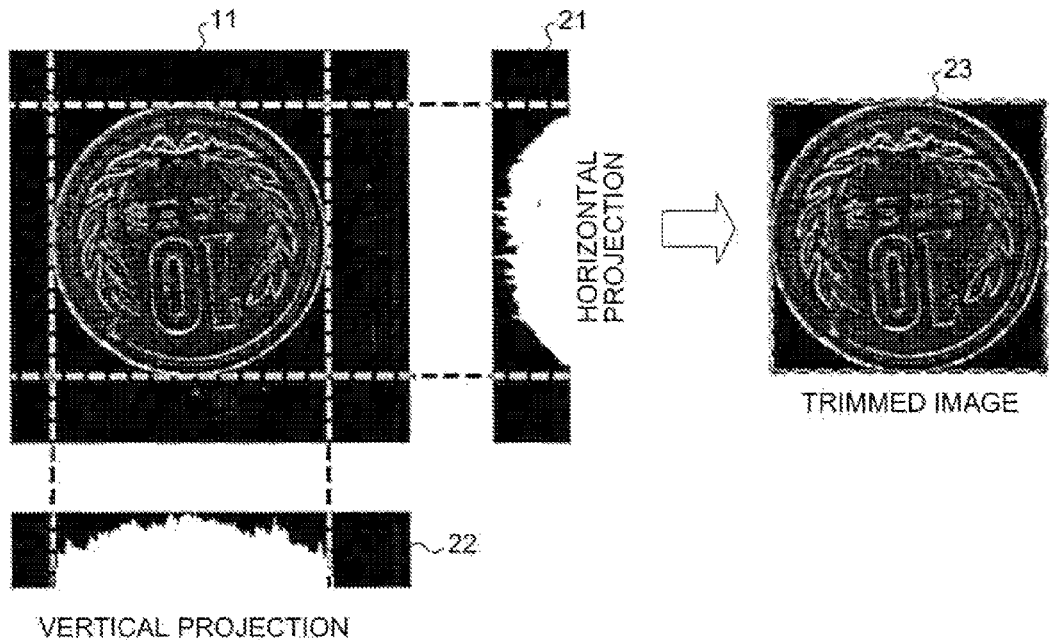

TRIMMED IMAGE → EDGE-EXTRACTED IMAGE → EDGE-NORMALIZED IMAGE

| AREA | CONDITION | MEANING |
|---|---|---|
| A+ | $r(x, y) \geq 0$ AND $t(x, y) \geq T_t$ | EDGE APPEARS AT RIGHT PLACE |
| A- | $r(x, y) < 0$ AND $t(x, y) \geq T_t$ | EDGE DOES NOT APPEAR AT RIGHT PLACE |
| B+ | $r(x, y) \geq 0$ AND $t(x, y) < T_t$ | EDGE DOES NOT APPEAR AT WRONG PLACE |
| B- | $r(x, y) < 0$ AND $t(x, y) < T_t$ | EDGE APPEARS AT WRONG PLACE |

FIG.12

| P 1 | P 2 | P 3 |
|---|---|---|
| P 4 | P 5 | P 6 |
| P 7 | P 8 | P 9 |

130a

POSITIVE-AREA
IMAGE MASK

| M 1 | M 2 | M 3 |
|---|---|---|
| M 4 | M 5 | M 6 |
| M 7 | M 8 | M 9 |

130b

NEGATIVE-AREA
IMAGE MASK

| S 1 | S 2 | S 3 |
|---|---|---|
| S 4 | S 5 | S 6 |
| S 7 | S 8 | S 9 |

INPUT IMAGE MASK

130d

| T 1 | T 2 | T 3 |
|---|---|---|
| T 4 | T 5 | T 6 |
| T 7 | T 8 | T 9 |

TEMPLATE IMAGE MASK

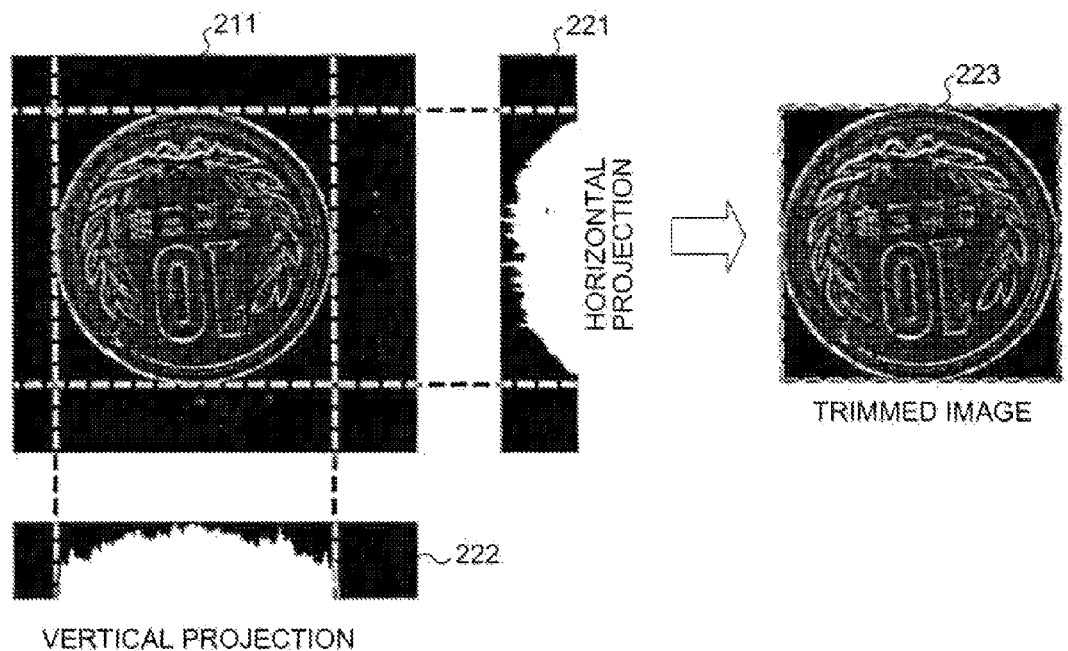

TRIMMED IMAGE → EDGE-EXTRACTED IMAGE → EDGE-NORMALIZED IMAGE

EDGE-NORMALIZED IMAGE

POLAR-COORDINATES-CONVERTED EDGE-NORMALIZED IMAGE

| AREA | CONDITION | MEANING |
|---|---|---|
| A+ | $r(k, \theta) \geqq 0$ AND $t(k, \theta) \geqq T_t$ | EDGE APPEARS AT RIGHT PLACE |
| A− | $r(k, \theta) < 0$ AND $t(k, \theta) \geqq T_t$ | EDGE DOES NOT APPEAR AT RIGHT PLACE |
| B+ | $r(k, \theta) \geqq 0$ AND $t(k, \theta) < T_t$ | EDGE DOES NOT APPEAR AT WRONG PLACE |
| B− | $r(k, \theta) < 0$ AND $t(k, \theta) < T_t$ | EDGE APPEARS AT WRONG PLACE |

FIG.30

330a — POSITIVE-AREA IMAGE MASK

| P 1 | P 2 | P 3 |
|-----|-----|-----|
| P 4 | P 5 | P 6 |
| P 7 | P 8 | P 9 |

330b — NEGATIVE-AREA IMAGE MASK

| M 1 | M 2 | M 3 |
|-----|-----|-----|
| M 4 | M 5 | M 6 |
| M 7 | M 8 | M 9 |

FIG.35

| S 1 | S 2 | S 3 |
| --- | --- | --- |
| S 4 | S 5 | S 6 |
| S 7 | S 8 | S 9 |

330c

INPUT IMAGE MASK

| T 1 | T 2 | T 3 |
| --- | --- | --- |
| T 4 | T 5 | T 6 |
| T 7 | T 8 | T 9 |

330d

TEMPLATE IMAGE MASK

APPARATUS AND METHOD FOR VERIFYING IMAGE BY COMPARISON WITH TEMPLATE IMAGE

TECHNICAL FIELD

The present invention relates to an image verifying apparatus, an image verifying method, and a computer program product for verifying an image by comparing features of images between an input image of an object to be verified and a plurality of template images registered in advance, and more particularly, to an image verifying apparatus, an image verifying method, and a computer program product capable of enhancing a verification rate by performing an efficient verification of the input image with the template image.

BACKGROUND ART

Conventionally, an image verifying apparatus that determines an authenticity of a currency is known, which verifies an input image obtained from photographing a deposited currency with an imaging device, such as a charged coupled device (CCD), with a template image that is registered in advance.

For instance, a technology for verifying an image disclosed in Patent Document 1 calculates a correlation value by comparing an input image of a coin with a template image of the coin, and determines that the coin corresponding to the input image is an authentic coin when the correlation value exceeds a threshold in a portion equal to or larger than a predetermined area from among an entire image to be compared.

Patent Document 1: Japanese Patent Application Laid-Open No. 2003-187289

DISCLOSURE OF INVENTION

Problem to be Solved by the Inventor

However, when the above conventional technology is employed, because the image verification is performed only using the correlation value that exceeds the threshold, for example, when the correlation value is turned out to be a relatively low value due to a deviation of the input image and the template image at the time of verification or an occurrence of a noise during an image conversion, a deposited coin is determined to be a counterfeit coin even if the coin is an authentic coin, which makes it difficult to enhance the verification rate of the image verification.

Furthermore, the above problem not only occurs when performing the image verification of the coin, but also occurs in the same way when performing an image verification of a paper currency or an image verification of a part or a product in a factory automation (FA) process.

The present invention is made in consideration of the above problem, and it is an object of the present invention to provide an image verifying apparatus, an image verifying method, and an image verifying program capable of increasing a precision of an image verification of a currency and articles other than the currency and enhancing the verification rate of the image verification.

Means for Solving Problem

To solve the above problems and to achieve the object, an image verifying apparatus according to the invention of claim 1 verifies an image by comparing features of images between an input image of an object to be verified and a plurality of template images registered in advance. The image verifying apparatus includes a correlation-value-image separating unit that generates a correlation value image from the input image and the template image, and separates the correlation value image into a positive correlation value image and a negative correlation value image depending on whether a pixel value is equal to or larger than a threshold; a template-image separating unit that separates the template image into a positive template image and a negative template image depending on whether a pixel value is equal to or larger than a threshold; a positive-negative-separated-correlation-image generating unit that generates a plurality of positive-negative-separated correlation-images by combining the positive correlation value image and the negative correlation value image with the positive template image and the negative template image; and a verification determining unit that performs a verification determination based on the positive-negative-separated correlation images.

An image verifying apparatus according to the invention of claim 2 has an aspect that, in the invention of claim 1, the positive-negative-separated-correlation-image generating unit generates a positive feature area image and a negative feature area image, the positive feature area image taking a value obtained by calculating a product of the positive correlation value image and the positive template image for each pixel as a pixel value, the negative feature area image taking a value obtained by calculating a product of the negative correlation value image and the positive template image for each pixel as a pixel value.

An image verifying apparatus according to the invention of claim 3 has an aspect that, in the invention of claim 1, the positive-negative-separated-correlation-image generating unit generates a positive background area image and a negative background area image, the positive background area image taking a value obtained by calculating a product of the positive correlation value image and the negative template image for each pixel as a pixel value, the negative background area image taking a value obtained by calculating a product of the negative correlation value image and the negative template image for each pixel as a pixel value.

An image verifying apparatus according to the invention of claim 4 has an aspect that, in the invention of claim 1, the positive-negative-separated-correlation-image generating unit generates a positive feature area image, a negative feature area image, a positive background area image, and a negative background area image, the positive feature area image taking a value obtained by calculating a product of the positive correlation value image and the positive template image for each pixel as a pixel value, the negative feature area image taking a value obtained by calculating a product of the negative correlation value image and the positive template image for each pixel as a pixel value, the positive background area image taking a value obtained by calculating a product of the positive correlation value image and the negative template image for each pixel as a pixel value, the negative background area image taking a value obtained by calculating a product of the negative correlation value image and the negative template image for each pixel as a pixel value.

An image verifying apparatus according to the invention of claim 5 has an aspect that, in the invention of claim 2, 3, or 4, the positive-negative-separated-correlation-image generating unit compares a target pixel in a negative area image generated by using the negative correlation value image with neighboring pixels surrounding a pixel corresponding to the target pixel in a positive area image generated by using the positive correlation value image, and when a pixel value of at least one of the neighboring pixels is larger than a pixel value of the target pixel, performs an expansion process of moving the target pixel to the pixel corresponding to the target pixel.

An image verifying apparatus according to the invention of claim 6 has an aspect that, in the invention of claim 1, each of the input image and the template image is an edge image obtained by an image conversion by an edge extracting process employing an edge extraction operator.

An image verifying apparatus according to the invention of claim 7 has an aspect that, in the invention of claim 6, the edge image is a normalized edge image obtained by normalizing an edge strength of extracted edge.

An image verifying apparatus according to the invention of claim 8 has an aspect that, in the invention of claim 1, the template image is an average image obtained by averaging individual images of the object to be verified.

An image verifying apparatus according to the invention of claim 9 has an aspect that, in the invention of claim 1, the correlation value image is an image having a normalized correlation value obtained by normalizing a correlation value of each pixel of either one of the input image and the template image as the pixel value.

An image verifying apparatus according to the invention of claim 10 has an aspect that, in the invention of claim 1, the verification determining unit performs the verification determination by calculating a verification value by segmenting the positive-negative-separated correlation images into blocks, calculating a total sum of pixel values in each of the blocks as a block value, and adding a product of the block value and a weighting coefficient for all of the positive-negative-separated correlation images.

An image verifying apparatus according to the invention of claim 11 has an aspect that, in the invention of claim 10, the verification determining unit calculates a value of the weighting coefficient by a linear discriminant analysis.

An image verifying apparatus according to the invention of claim 12 has an aspect that, in the invention of claim 1, the object to be verified is a currency.

An image verifying method according to the invention of claim 13 is for verifying an image by comparing features of images between an input image of an object to be verified and a plurality of template images registered in advance. The image verifying method includes a correlation-value-image separating step of generating a correlation value image from the input image and the template image, and separating the correlation value image into a positive correlation value image and a negative correlation value image depending on whether a pixel value is equal to or larger than a threshold; a template-image separating step of separating the template image into a positive template image and a negative template image depending on whether a pixel value is equal to or larger than a threshold; a positive-negative-separated-correlation-image generating step of generating a plurality of positive-negative-separated correlation-images by combining the positive correlation value image and the negative correlation value image with the positive template image and the negative template image; and a verification determining step of performing a verification determination based on the positive-negative-separated correlation images.

An image verifying program according to the invention of claim 14 is for verifying an image by comparing features of images between an input image of an object to be verified and a plurality of template images registered in advance. The image verifying program causes a computer to execute a correlation-value-image separating step of generating a correlation value image from the input image and the template image, and separating the correlation value image into a positive correlation value image and a negative correlation value image depending on whether a pixel value is equal to or larger than a threshold; a template-image separating step of separating the template image into a positive template image and a negative template image depending on whether a pixel value is equal to or larger than a threshold; a positive-negative-separated-correlation-image generating step of generating a plurality of positive-negative-separated correlation-images by combining the positive correlation value image and the negative correlation value image with the positive template image and the negative template image; and a verification determining step of performing a verification determination based on the positive-negative-separated correlation images.

An image verifying apparatus according to the invention of claim 15 verifies an image by comparing features of images between an input image of a circular object and a plurality of template images registered in advance. The image verifying apparatus includes a polar-coordinates-converted-image generating unit that performs a polar-coordinates conversion of the input image and the template image, and generates a $\rho$-$\theta$ input image and a $\rho$-$\theta$ template image for which a deviation of rotation between the images is compensated; a correlation-value-image separating unit that generates a correlation value image from the $\rho$-$\theta$ input image and the $\rho$-$\theta$ template image, and separates the correlation value image into a positive correlation value image and a negative correlation value image depending on whether a pixel value is equal to or larger than a threshold; a template-image separating unit that separates the $\rho$-$\theta$ template image into a positive template image and a negative template image depending on whether a pixel value is equal to or larger than a threshold; a positive-negative-separated-correlation-image generating unit that generates a plurality of positive-negative-separated correlation-images by combining the positive correlation value image and the negative correlation value image with the positive template image and the negative template image; and a verification determining unit that performs a verification determination based on the positive-negative-separated correlation images.

An image verifying apparatus according to the invention of claim 16 has an aspect that, in the invention of claim 15, the positive-negative-separated-correlation-image generating unit generates a positive feature area image and a negative feature area image, the positive feature area image taking a value obtained by calculating a product of the positive correlation value image and the positive template image for each pixel as a pixel value, the negative feature area image taking a value obtained by calculating a product of the negative correlation value image and the positive template image for each pixel as a pixel value.

An image verifying apparatus according to the invention of claim 17 has an aspect that, in the invention of claim 15, the positive-negative-separated-correlation-image generating unit generates a positive background area image and a negative background area image, the positive background area image taking a value obtained by calculating a product of the positive correlation value image and the negative template image for each pixel as a pixel value, the negative background area image taking a value obtained by calculating a product of the negative correlation value image and the negative template image for each pixel as a pixel value.

An image verifying apparatus according to the invention of claim 18 has an aspect that, in the invention of claim 15, the positive-negative-separated-correlation-image generating unit generates a positive feature area image, a negative feature area image, a positive background area image, and a negative background area image, the positive feature area image taking a value obtained by calculating a product of the positive correlation value image and the positive template image for each pixel as a pixel value, the negative feature area image taking a value obtained by calculating a product of the negative correlation value image and the positive template image for each pixel as a pixel value, the positive background area image taking a value obtained by calculating a product of the positive correlation value image and the negative template image for each pixel as a pixel value, the negative background area image taking a value obtained by calculating a product of the negative correlation value image and the negative template image for each pixel as a pixel value.

An image verifying apparatus according to the invention of claim 19 has an aspect that, in the invention of claim 16, 17, or 18, the positive-negative-separated-correlation-image generating unit compares a target pixel in a negative area image generated by using the negative correlation value image with neighboring pixels surrounding a pixel corresponding to the target pixel in a positive area image generated by using the positive correlation value image, and when a pixel value of at least one of the neighboring pixels is larger than a pixel value of the target pixel, performs an expansion process of moving the target pixel to the pixel corresponding to the target pixel.

An image verifying apparatus according to the invention of claim 20 has an aspect that, in the invention of claim 15, each of the $\rho$-$\theta$ input image and the $\rho$-$\theta$ template image is an edge image obtained by an image conversion by an edge extracting process employing an edge extraction operator.

An image verifying apparatus according to the invention of claim 21 has an aspect that, in the invention of claim 20, the edge image is a normalized edge image obtained by normalizing an edge strength of extracted edge.

An image verifying apparatus according to the invention of claim 22 has an aspect that, in the invention of claim 15, the template image is an average image obtained by averaging individual images of the object to be verified.

An image verifying apparatus according to the invention of claim 23 has an aspect that, in the invention of claim 15, the correlation value image is an image having a normalized correlation value obtained by normalizing a correlation value of each pixel of the $\rho$-$\theta$ input image and the $\rho$-$\theta$ template image as the pixel value.

An image verifying apparatus according to the invention of claim 24 has an aspect that, in the invention of claim 15, the verification determining unit performs the verification determination by calculating a verification value by segmenting the positive-negative-separated correlation images into blocks, calculating a total sum of pixel values in each of the blocks as a block value, and adding a product of the block value and a weighting coefficient for all of the positive-negative-separated correlation images.

An image verifying apparatus according to the invention of claim 25 has an aspect that, in the invention of claim 24, the verification determining unit calculates a value of the weighting coefficient by a linear discriminant analysis.

An image verifying apparatus according to the invention of claim 26 has an aspect that, in the invention of claim 15, the polar-coordinates-converted-image generating unit compensates the deviation of rotation between the images by performing a parallel shift of either one of the $\rho$-$\theta$ input image and the $\rho$-$\theta$ template image.

An image verifying apparatus according to the invention of claim 27 has an aspect that, in the invention of claim 15, the circular object is a coin.

An image verifying method according to the invention of claim 28 is for verifying an image by comparing features of images between an input image of a circular object and a plurality of template images registered in advance. The image verifying method includes a polar-coordinates-converted-image generating step of performing a polar-coordinates conversion of the input image and the template image, and generating a $\rho$-$\theta$ input image and a $\rho$-$\theta$ template image for which a deviation of rotation between the images is compensated; a correlation-value-image separating step of generating a correlation value image from the $\rho$-$\theta$ input image and the $\rho$-$\theta$ template image, and separating the correlation value image into a positive correlation value image and a negative correlation value image depending on whether a pixel value is equal to or larger than a threshold; a template-image separating step of separating the $\rho$-$\theta$ template image into a positive template image and a negative template image depending on whether a pixel value is equal to or larger than a threshold; a positive-negative-separated-correlation-image generating step of generating a plurality of positive-negative-separated correlation-images by combining the positive correlation value image and the negative correlation value image with the positive template image and the negative template image; and a verification determining step of performing a verification determination based on the positive-negative-separated correlation images.

An image verifying program according to the invention of claim 29 is for verifying an image by comparing features of images between an input image of a circular object and a plurality of template images registered in advance. The image verifying program causes a computer to execute a polar-coordinates-converted-image generating step of performing a polar-coordinates conversion of the input image and the template image, and generating a $\rho$-$\theta$ input image and a $\rho$-$\theta$ template image for which a deviation of rotation between the images is compensated; a correlation-value-image separating step of generating a correlation value image from the $\rho$-$\theta$ input image and the $\rho$-$\theta$ template image, and separating the correlation value image into a positive correlation value image and a negative correlation value image depending on whether a pixel value is equal to or larger than a threshold; a template-image separating step of separating the $\rho$-$\theta$ template image into a positive template image and a negative template image depending on whether a pixel value is equal to or larger than a threshold; a positive-negative-separated-correlation-image generating step of generating a plurality of positive-negative-separated correlation-images by combining the positive correlation value image and the negative correlation value image with the positive template image and the negative template image; and a verification determining step of performing a verification determination based on the positive-negative-separated correlation images.

EFFECT OF THE INVENTION

According to the invention of claim 1, a correlation-value image is generated from an input image and a template image, the correlation-value image is separated into a positive-correlation-value image and a negative-correlation-value image depending on whether a pixel value is equal to or higher than a threshold, the template image is separated into a positive template image and a negative template image depending on whether a pixel value is equal to or higher than a threshold, a plurality of positive-negative-separated correlation images are generated from a combination of the positive-correlation-value image/negative-correlation-value image and the positive template image/negative template image, and a verification determination is performed based on the positive-negative-separated correlation images. Therefore, it is possible to perform an image verification with a high precision, enhancing a verification rate of an image, by performing the image verification not only using a portion in which a correlation between the input image and the template image is high but also using a portion in which the correlation is low, and not only using a feature portion of the template image but also using a background portion.

According to the invention of claim 2, a positive feature area image that takes a value obtained by calculating a product of the positive correlation value image and the positive template image for each pixel as a pixel value and a negative feature area image that takes a value obtained by calculating a product of the negative correlation value image and the positive template image for each pixel as a pixel value are generated. Therefore, it is possible to perform an image verification with a high precision, enhancing a verification rate of an image, by performing an image verification using an area image in which a feature comes out in a right place where the feature should come out and an area image in which a feature does not come out at the right place.

According to the invention of claim 3, a positive background area image that takes a value obtained by calculating a product of the positive correlation value image and the negative template image for each pixel as a pixel value and a negative background area image that takes a value obtained by calculating a product of the negative correlation value image and the negative template image for each pixel as a pixel value are generated. Therefore, it is possible to perform an image verification with a high precision, enhancing a verification rate of an image, by performing an image verification using an area image in which a background comes out in a right place where the background should come out and an area image in which a background does not come out at the right place.

According to the invention of claim 4, a positive feature area image, a negative feature area image, a positive background area image, and a negative background area image are generated, where the positive feature area image takes a value obtained by calculating a product of the positive correlation value image and the positive template image for each pixel as a pixel value, the negative feature area image takes a value obtained by calculating a product of the negative correlation value image and the positive template image for each pixel as a pixel value, the positive background area image takes a value obtained by calculating a product of the positive correlation value image and the negative template image for each pixel as a pixel value, and the negative background area image takes a value obtained by calculating a product of the negative correlation value image and the negative template image for each pixel as a pixel value. Therefore, it is possible to perform an image verification with a high precision, enhancing a verification rate of an image, by performing an image verification using an area image in which a feature comes out in a right place where the feature should come out, an area image in which a feature does not come out at the right place, an area image in which a background comes out in a right place where the background should come out, and an area image in which a background does not come out at the right place.

According to the invention of claim 5, a target pixel in a negative area image generated by using the negative correlation value image is compared with neighboring pixels surrounding a pixel corresponding to the target pixel in a positive area image generated by using the positive correlation value image, and when a pixel value of at least one of the neighboring pixels is larger than a pixel value of the target pixel, an expansion process of moving the target pixel to the pixel corresponding to the target pixel is performed. Therefore, it is possible to perform an image verification with a high precision, enhancing a verification rate of an image, by removing an influence of an isolated point accompanied by the calculation of the correlation value.

According to the invention of claim 6, each of the input image and the template image is an edge image obtained by an image conversion by an edge extracting process employing an edge extraction operator. Therefore, it is possible to perform an image verification with a high precision, enhancing a verification rate of an image, by comparing extracted feature areas of each of the images.

According to the invention of claim 7, the edge image is a normalized edge image obtained by normalizing an edge strength of extracted edge. Therefore, it is possible to perform an image verification with a high precision, enhancing a verification rate of an image, by removing an influence of an individual difference of the object to be verified.

According to the invention of claim 8, the template image is an average image obtained by averaging individual images of the object to be verified. Therefore, it is possible to perform an image verification with a high precision, enhancing a verification rate of an image, even when there is a unique pattern in the object to be verified.

According to the invention of claim 9, the correlation value image is an image having a normalized correlation value obtained by normalizing a correlation value of each pixel of either one of the input image and the template image as the pixel value. Therefore, it is possible to perform an image verification with a high precision, enhancing a verification rate of an image, with a suppressed fluctuation of the correlation value.

According to the invention of claim 10, the verification determining unit performs the verification determination by calculating a verification value by segmenting the positive-negative-separated correlation images into blocks, calculating a total sum of pixel values in each of the blocks as a block value, and adding a product of the block value and a weighting coefficient for all of the positive-negative-separated correlation images. Therefore, a weight of an area where the feature easily comes out and a weight of an area where the feature hardly comes out can be adjusted, and an efficient image verification can be performed by simplifying a calculation procedure. As a result, it is possible to enhance the verification rate of the image.

According to the invention of claim 11, the verification determining unit calculates a value of the weighting coefficient by a linear discriminant analysis. Therefore, it is possible to perform an image verification with a high precision, enhancing a verification rate of an image, because an appropriate weighting coefficient can be obtained based on the learning sample.

According to the invention of claim 12, the object to be verified is a currency. Therefore, it is possible to perform an image verification with a high precision, enhancing a verification rate of an image, regarding the currency.

According to the invention of claim 13, a correlation value image is generated from the input image and the template image, the correlation value image is separated into a positive correlation value image and a negative correlation value image depending on whether a pixel value is equal to or larger than a threshold, the template image is separated into a positive template image and a negative template image depending on whether a pixel value is equal to or larger than a threshold, a plurality of positive-negative-separated correlation-images are generated by combining the positive correlation value image and the negative correlation value image with the positive template image and the negative template image, and a verification determination is performed based on the positive-negative-separated correlation images. Therefore, it is possible to perform an image verification with a high precision, enhancing a verification rate of an image, by performing the image verification not only using a portion in which a correlation between the input image and the template image is high but also using a portion in which the correlation is low, and not only using a feature portion of the template image but also using a background portion.

According to the invention of claim 14, a correlation value image is generated from the input image and the template image, the correlation value image is separated into a positive correlation value image and a negative correlation value image depending on whether a pixel value is equal to or larger than a threshold, the template image is separated into a positive template image and a negative template image depending on whether a pixel value is equal to or larger than a threshold, a plurality of positive-negative-separated correlation-images are generated by combining the positive correlation value image and the negative correlation value image with the positive template image and the negative template image, and a verification determination is performed based on the positive-negative-separated correlation images. Therefore, it is possible to perform an image verification with a high precision, by performing the image verification not only using a portion in which a correlation between the input image and the template image is high but also using a portion in which the correlation is low, and not only using a feature portion of the template image but also using a background portion.

According to the invention of claim 15, a polar-coordinates conversion of the input image and the template image is performed, a $\rho$-$\theta$ input image and a $\rho$-$\theta$ template image for which a deviation of rotation between the images is compensated are generated, a correlation value image is generated from the $\rho$-$\theta$ input image and the $\rho$-$\theta$ template image, the correlation value image is separated into a positive correlation value image and a negative correlation value image depending on whether a pixel value is equal to or larger than a threshold the $\rho$-$\theta$ template image is separated into a positive template image and a negative template image depending on whether a pixel value is equal to or larger than a threshold, a plurality of positive-negative-separated correlation-images are generated by combining the positive correlation value image and the negative correlation value image with the positive template image and the negative template image, and a verification determination is performed based on the positive-negative-separated correlation images. Therefore, it is possible to perform an image verification with a high precision, by performing the image verification not only using a portion in which a correlation between the input image and the template image is high but also using a portion in which the correlation is low, and not only using a feature portion of the template image but also using a background portion.

According to the invention of claim 16, a positive feature area image that takes a value obtained by calculating a product of the positive correlation value image and the positive template image for each pixel as a pixel value and a negative feature area image that takes a value obtained by calculating a product of the negative correlation value image and the positive template image for each pixel as a pixel value are generated. Therefore, it is possible to perform an image verification with a high precision, by performing an image verification using an area image in which a feature comes out in a right place where the feature should come out and an area image in which a feature does not come out at the right place.

According to the invention of claim 17, a positive background area image that takes a value obtained by calculating a product of the positive correlation value image and the negative template image for each pixel as a pixel value and a negative background area image that takes a value obtained by calculating a product of the negative correlation value image and the negative template image for each pixel as a pixel value are generated. Therefore, it is possible to perform an image verification with a high precision, by performing an image verification using an area image in which a background comes out in a right place where the background should come out and an area image in which a background does not come out at the right place.

According to the invention of claim 18, a positive feature area image, a negative feature area image, a positive background area image, and a negative background area image are generated, where the positive feature area image takes a value obtained by calculating a product of the positive correlation value image and the positive template image for each pixel as a pixel value, the negative feature area image takes a value obtained by calculating a product of the negative correlation value image and the positive template image for each pixel as a pixel value, the positive background area image takes a value obtained by calculating a product of the positive correlation value image and the negative template image for each pixel as a pixel value, and the negative background area image takes a value obtained by calculating a product of the negative correlation value image and the negative template image for each pixel as a pixel value. Therefore, it is possible to perform an image verification with a high precision, using an area image in which a feature comes out in a right place where the feature should come out, an area image in which a feature does not come out at the right place, an area image in which a background comes out in a right place where the background should come out, and an area image in which a background does not come out at the right place.

According to the invention of claim 19, a target pixel in a negative area image generated by using the negative correlation value image is compared with neighboring pixels surrounding a pixel corresponding to the target pixel in a positive area image generated by using the positive correlation value image, and when a pixel value of at least one of the neighboring pixels is larger than a pixel value of the target pixel, an expansion process of moving the target pixel to the pixel corresponding to the target pixel is performed. Therefore, it is possible to perform an image verification with a high precision, by removing an influence of an isolated point accompanied by the calculation of the correlation value.

According to the invention of claim 20, each of the $\rho$-$\theta$ input image and the $\rho$-$\theta$ template image is an edge image obtained by an image conversion by an edge extracting process employing an edge extraction operator. Therefore, it is possible to perform an image verification with a high precision, by comparing extracted feature area of each of the images.

According to the invention of claim 21, the edge image is a normalized edge image obtained by normalizing an edge strength of extracted edge. Therefore, it is possible to perform an image verification with a high precision, by removing an influence of an individual difference of the object to be verified.

According to the invention of claim 22, the template image is an average image obtained by averaging individual images of the object to be verified. Therefore, it is possible to perform an image verification with a high precision, even when there is a unique pattern in the object to be verified.

According to the invention of claim 23, the correlation value image is an image having a normalized correlation value obtained by normalizing a correlation value of each pixel of the $\rho$-$\theta$ input image and the $\rho$-$\theta$ template image as the pixel value. Therefore, it is possible to perform an image verification with a high precision, with a suppressed fluctuation of the correlation value.

According to the invention of claim 24, the verification determining unit performs the verification determination by calculating a verification value by segmenting the positive-negative-separated correlation images into blocks, calculating a total sum of pixel values in each of the blocks as a block value, and adding a product of the block value and a weighting coefficient for all of the positive-negative-separated correlation images. Therefore, a weight of an area where the feature easily comes out and a weight of an area where the feature hardly comes out can be adjusted, and it is possible to perform an efficient image verification by simplifying a calculation procedure.

According to the invention of claim 25, the verification determining unit calculates a value of the weighting coefficient by a linear discriminant analysis. Therefore, it is possible to perform an image verification with a high precision, because an appropriate weighting coefficient can be obtained based on the learning sample.

According to the invention of claim 26, the polar-coordinates-converted-image generating unit compensates the deviation of rotation between the images by performing a parallel shift of either one of the $\rho$-$\theta$ input image and the $\rho$-$\theta$ template image. Therefore, it is possible to perform an efficient image verification, by reducing an amount of calculation accompanied by the compensation.

According to the invention of claim 27, the circular object is a coin. Therefore, it is possible to perform an image verification with a high precision, regarding a verification of a currency.

According to the invention of claim 28, a polar-coordinates conversion of the input image and the template image is performed, a $\rho$-$\theta$ input image and a $\rho$-$\theta$ template image for which a deviation of rotation between the images is compensated are generated, a correlation value image is generated from the $\rho$-$\theta$ input image and the $\rho$-$\theta$ template image, the correlation value image is separated into a positive correlation value image and a negative correlation value image depending on whether a pixel value is equal to or larger than a threshold the $\rho$-$\theta$ template image is separated into a positive template image and a negative template image depending on whether a pixel value is equal to or larger than a threshold, a plurality of positive-negative-separated correlation-images are generated by combining the positive correlation value image and the negative correlation value image with the positive template image and the negative template image, and a verification determination is performed based on the positive-negative-separated correlation images. Therefore, it is possible to perform an image verification with a high precision, by performing the image verification not only using a portion in which a correlation between the input image and the template image is high but also using a portion in which the correlation is low, and not only using a feature portion of the template image but also using a background portion.

According to the invention of claim 29, a polar-coordinates conversion of the input image and the template image is performed, a $\rho$-$\theta$ input image and a $\rho$-$\theta$ template image for which a deviation of rotation between the images is compensated are generated, a correlation value image is generated from the $\rho$-$\theta$ input image and the $\rho$-$\theta$ template image, the correlation value image is separated into a positive correlation value image and a negative correlation value image depending on whether a pixel value is equal to or larger than a threshold the $\rho$-$\theta$ template image is separated into a positive template image and a negative template image depending on whether a pixel value is equal to or larger than a threshold, a plurality of positive-negative-separated correlation-images are generated by combining the positive correlation value image and the negative correlation value image with the positive template image and the negative template image, and a verification determination is performed based on the positive-negative-separated correlation images. Therefore, it is possible to perform an image verification with a high precision, by performing the image verification not only using a portion in which a correlation between the input image and the template image is high but also using a portion in which the correlation is low, and not only using a feature portion of the template image but also using a background portion.

BRIEF DESCRIPTION OF DRAWINGS

FIG. 2 is a schematic diagram for explaining a processing outline of an image trimming unit shown in FIG. 1;

FIG. 3 is a schematic diagram for explaining a Sobel operator used in an edge extracting unit shown in FIG. 1;

FIG. 12 is a schematic diagram for explaining an image mask used in an expansion processing unit according to the first embodiment;

FIG. 17 is a schematic diagram for explaining an image mask used in the modification example shown in FIG. 16;

FIG. 20 is a schematic diagram for explaining a processing outline of an image trimming unit shown in FIG. 19;

FIG. 21 is a schematic diagram for explaining a Sobel operator used in an edge extracting unit shown in FIG. 19;

FIG. 30 is a schematic diagram for explaining an image mask used in an expansion processing unit according to the second embodiment;

FIG. 35 is a schematic diagram for explaining an image mask used in the modification example shown in FIG. 34.

Figure 1:
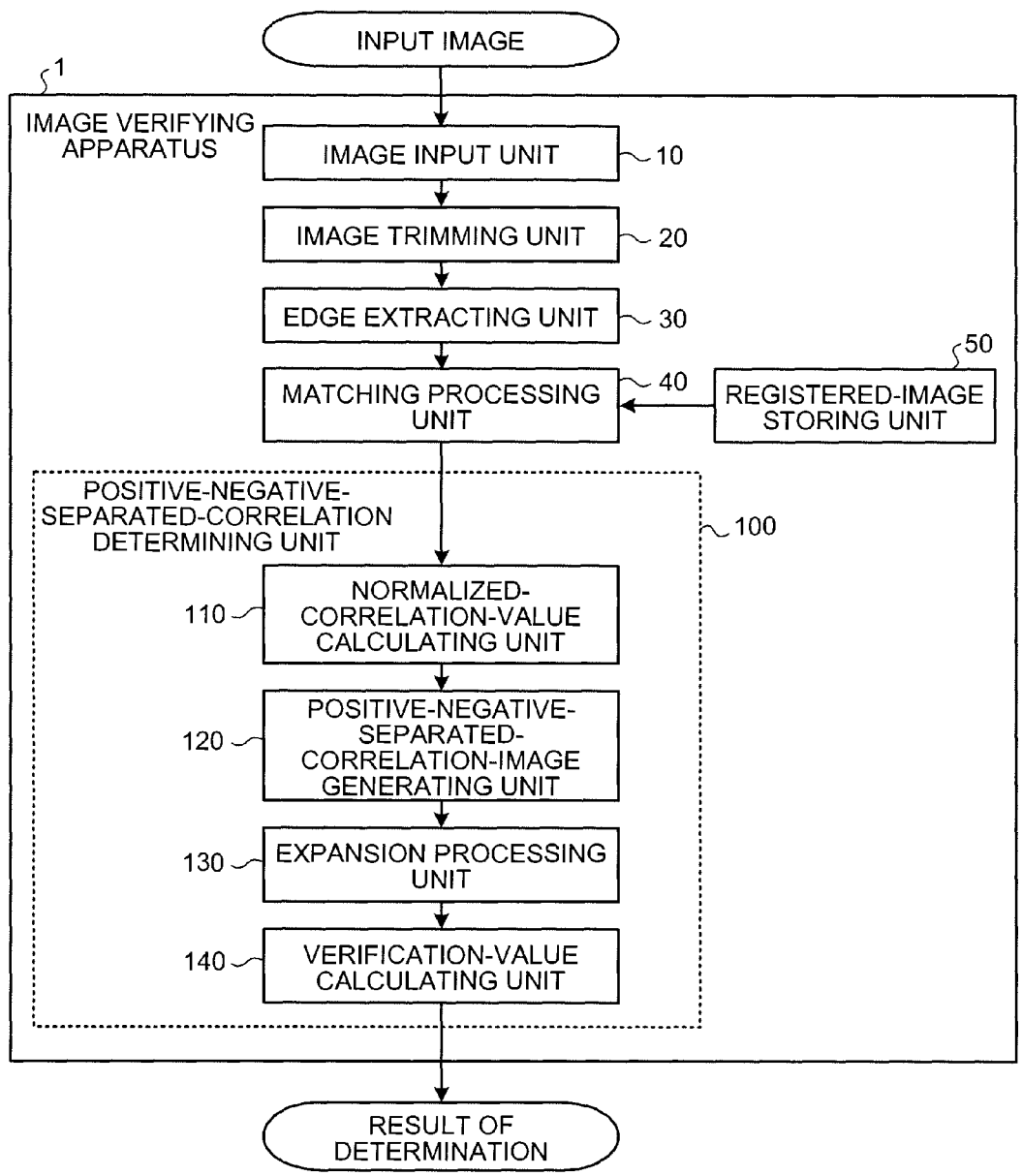
FIG. 1 is a functional block diagram for explaining a configuration of an image verifying apparatus according to a first embodiment of the present invention.

EXPLANATIONS OF LETTERS OR NUMERALS 1 image verifying apparatus
10 image input unit
11 input image
20 image trimming unit
21 horizontal projection
22 vertical projection
23 trimmed image (back side)
24 trimmed image (front side)
30 edge extracting unit
30a Sobel operator (for horizontal edge calculation)
30b Sobel operator (for vertical edge calculation)
31 edge-extracted image
32 edge-normalized image (back side)
33 edge-normalized image (front side)
40 matching processing unit
50 registered-image storing unit
51 template image
51a t+ image
51b t− image
100 positive-negative-separated-correlation determining unit
110 normalized-correlation-value calculating unit
111 normalized-correlation-value image
111a r+ image
111b r− image
120 positive-negative-separated-correlation-image generating unit
121 A+ area image
122 A− area image
123 B+ area image
124 B− area image
130 expansion processing unit
130a positive-area image mask
130b negative-area image mask
130c input image mask
130d template image mask
131 expanded A+ area image
132 expanded A− area image
133 expanded B+ area image
134 expanded B− area image
135 expanded normalized-correlation-value image
135a expanded r+ image
135b expanded r− image
140 verification-value calculating unit
141 block segmentation (A+ area)
142 block segmentation (A− area)
143 block segmentation (B+ area)
144 block segmentation (B− area)
201 image verifying apparatus
210 image input unit
211 input image
220 image trimming unit
221 horizontal projection
222 vertical projection
223 trimmed image
230 edge extracting unit
230a Sobel operator (for horizontal edge calculation)
230b Sobel operator (for vertical edge calculation)
231 edge-extracted image
232 edge-normalized image
233 polar-coordinates-converted edge-normalized image
240 matching processing unit
240a polar-coordinates converting unit
240b rotation-angle detecting unit
240c side determining unit
250 registered-image storing unit
251 template image
251a t+ image
251b t− image
300 positive-negative-separated-correlation determining unit
310 normalized-correlation-value calculating unit
311 normalized-correlation-value image
311a r+ image
311b r− image
320 positive-negative-separated-correlation-image generating unit
321 A+ area image
322 A− area image
323 B+ area image
324 B− area image
330 expansion processing unit
330a positive-area image mask
330b negative-area image mask 330c input image mask
330d template image mask
331 expanded A+ area image
332 expanded A− area image
333 expanded B+ area image
334 expanded B− area image
335 expanded normalized-correlation-value image
335a expanded r+ image
335b expanded r− image
340 verification-value calculating unit

BEST MODE(S) FOR CARRYING OUT THE INVENTION

A first embodiment and a second embodiment of an image verifying apparatus, an image verifying method, and an image verifying program according to the present invention will be explained in detail below with reference to the accompanying drawings. An image verification employing a Cartesian coordinate system and an image verification employing a polar coordinate system will be explained in the first embodiment and the second embodiment, respectively.

First Embodiment

FIG. 1 is a functional block diagram for explaining a configuration of an image verifying apparatus according to the first embodiment. As shown in the figure, an image verifying apparatus 1 includes an image input unit 10, an image trimming unit 20, an edge extracting unit 30, a matching processing unit 40, a registered-image storing unit 50, and a positive-negative-separated-correlation determining unit 100. The positive-negative-separated-correlation determining unit 100 includes a normalized-correlation-value calculating unit 110, a positive-negative-separated-correlation-image generating unit 120, an expansion processing unit 130, and a verification-value calculating unit 140.

The image input unit 10 is an input unit to import an input image of a coin that is a target of a verification into the apparatus, which outputs imported input image to the image trimming unit 20. The image input unit 10 treats the input image as a collective entity of a predetermined number of pixels. For instance, the image input unit 10 recognizes the input image as a grey-scale image having a tone value of 256 gradation levels, and outputs the input image to the image trimming unit 20 as a rectangular image of a predetermined size.

The image trimming unit 20 receives the rectangular image from the image input unit 10, trims a portion of the image in a square area that circumscribes the coin image, and outputs trimmed image to the edge extracting unit 30.

FIG. 2 is a schematic diagram for explaining a processing outline of the image trimming unit 20. As shown in the figure, the image trimming unit 20 scans an input image 11 in a horizontal direction to accumulate tone values of all pixels, and generates a horizontal projection 21. In addition, the image trimming unit 20 scans the input image 11 in a vertical direction, and generates a vertical projection 22 in the same procedure. After that, the image trimming unit 20 scans the horizontal projection 21 and the vertical projection 22, and calculates rising coordinates and falling coordinates of accumulated tone values. As indicated by four broken lines shown in the figure, the image trimming unit 20 trims an area surrounded by calculated coordinates as a trimmed image 23, and outputs the trimmed image 23 to the edge extracting unit 30.

Referring back to FIG. 1, the edge extracting unit 30 will be explained. The edge extracting unit 30 receives the trimmed image 23 from the image trimming unit 20, and calculates a tone change (edge strength) of the trimmed image 23 to avoid an influence caused by individual difference of the trimmed image 23, such as brightness and hue. In addition, the edge extracting unit 30 performs a normalization of the edge strength to suppress a fluctuation of calculated edge strength. Specifically, the edge extracting unit 30 calculates the edge strength by performing an edge extracting process using a Sobel operator on the trimmed image 23, and normalizes a result of the calculation. Although the Sobel operator is employed in the first embodiment, it is also possible to extract the edge by using a Roberts operator and the like.

FIG. 3 is a schematic diagram for explaining the Sobel operator. As shown in the figure, the edge extracting unit 30 performs a calculation of the edge strength by using two Sobel operators, a Sobel operator for horizontal edge calculation 30a and a Sobel operator for vertical edge calculation 30b. Specifically, the edge extracting unit 30 scans each of the Sobel operators (30a and 30b) for all pixels of the trimmed image 23, and obtains a horizontal edge-calculation result Gx and a vertical edge-calculation result Gy. After that, the edge extracting unit 30 calculates the edge strength (G) in each of the pixels, and then normalizes (E) the edge strength.

[Numerical Expression 1]

$$G = |G_x| + |G_y| \tag{1}$$

$$E = c \times \frac{G}{\sum G} \tag{2}$$

As expressed by Equation (1), the edge strength (G) in each of the pixels is represented by a sum of an absolute value of the horizontal edge-calculation result Gx and an absolute value of the vertical edge-calculation result Gy. The normalized edge strength (E) is, as expressed by Equation (2), obtained by dividing a product of the edge strength (G) and a constant c that is a predetermined value set for a type of the coin by a total sum of the edge strengths (G) of all of the pixels.

In this manner, by performing the normalization of the edge strength, it is possible to suppress an occurrence of a fluctuation of the edge strength between a coin from which the edge can be easily extracted and a coin from which the edge can be hardly extracted, and as a result, a verification of various types of coins can be performed with a high precision.

Figure 4:
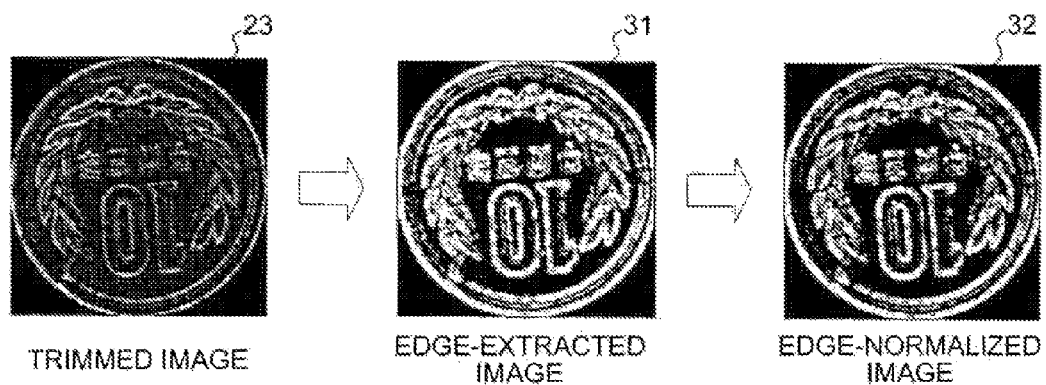
FIG. 4 is a schematic diagram for explaining a processing outline of the edge extracting unit shown in FIG. 1.

FIG. 4 is a schematic diagram for explaining an outline of the edge extracting process (image converting process) performed by the edge extracting unit 30. As shown in the figure, the trimmed image 23 is converted into an edge-extracted image 31 by the edge-strength calculating process using the Sobel operator. After that, the edge-extracted image 31 is converted into an edge-normalized image 32 by the edge-strength normalizing process using Equations (1) and (2). The edge extracting unit 30 outputs the edge-normalized image 32 to the matching processing unit 40.

Each pixel value of the edge-extracted image 31 shown in the figure takes a value of, for example, 0 to 255, which is a grey-scale value with 0 corresponding to black and 255 corresponding to white. In the edge-extracted image 31 shown in the figure, a white portion is an extracted edge portion, and a black portion is a background portion. Each pixel value of the edge-normalized image 32 takes a value of, for example, 0 to 255, which is a grey-scale value with 0 corresponding to black and 255 corresponding to white. In the edge-normalized image 32 in the figure, a white portion is corresponding to an edge portion, and a black portion is corresponding to a background, as in the case with the edge-extracted image 31.

Referring back to FIG. 1, the matching processing unit 40 will be explained. The matching processing unit 40 receives the edge-normalized image 32 from the edge extracting unit 30, and performs a verification process of received image with a template image stored in the registered-image storing unit 50. Specifically, the matching processing unit 40 rotates the template image step by step with a predetermined angle, and obtains a rotation angle (φ) with which a coincidence (M) between the template image and the edge-normalized image 32 is maximized in each rotation angle. The coincidence (M) is calculated by

[Numerical Expression 2]

$$M(\phi) = \sum_x \sum_y t_\phi(x, y) \cdot s(x, y) \quad (3)$$

As expressed by Equation (3), the coincidence M(φ) in each rotation angle (φ) is obtained by taking a total sum of products of a tone value t(x, y) of each pixel of the template image that is rotated by an angle (φ) and a tone value s(x, y) of each pixel of the edge-normalized image 32 of all of the pixels.

Figure 5:
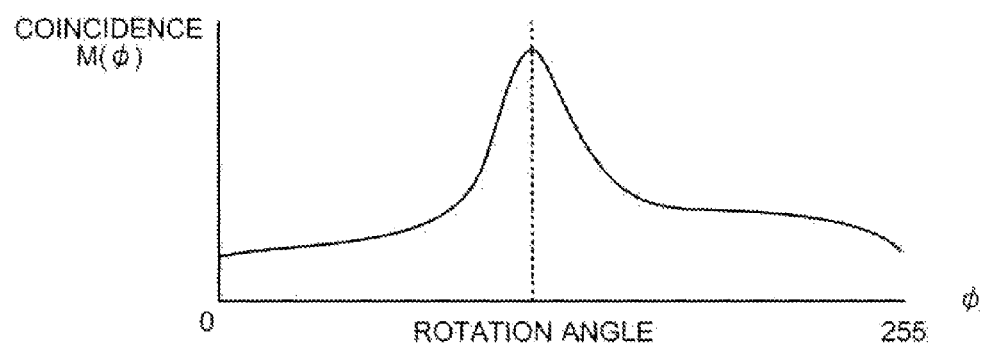
FIG. 5 is a graph for explaining a processing outline of a matching determination performed by a matching processing unit shown in FIG. 1.

FIG. 5 is a graph for explaining an outline of a matching determination performed by the matching processing unit 40. As shown in the figure, a value of M(φ) takes a maximum value at a specific rotation angle, making a graph having a shape of a convex upward. The matching processing unit 40 acquires a value of φ with which the M(φ) is maximized (a peak of the convex), and rotates the template image stored in the registered-image storing unit 50 by the angle φ. After that, the matching processing unit 40 outputs the edge-normalized image 32 and rotated template image to the positive-negative-separated-correlation determining unit 100.

Figure 6:
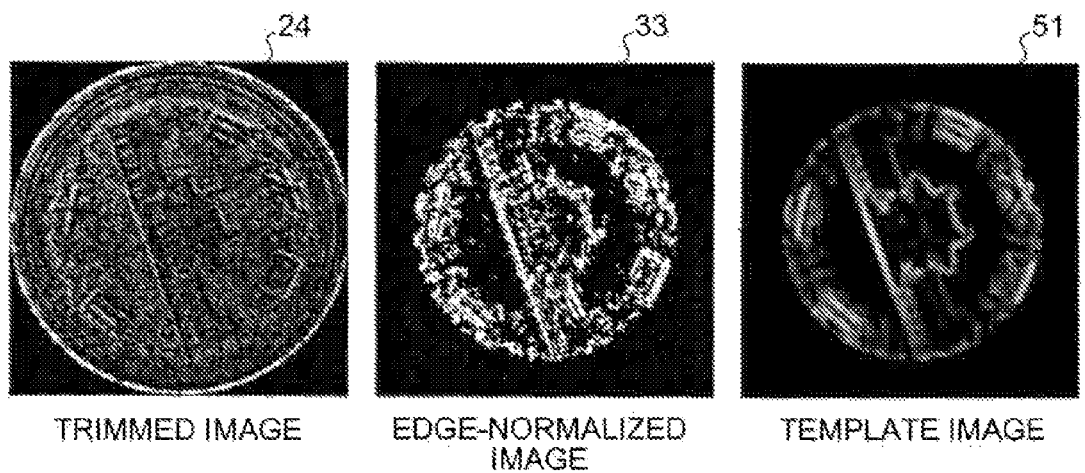
FIG. 6 is a schematic diagram for explaining an image that is input to a positive-negative-separated-correlation determining unit according to the first embodiment.

FIG. 6 is a schematic diagram for explaining image examples of the edge-normalization-processed image and the rotated template image that are output to the positive-negative-separated-correlation determining unit 100 from the matching processing unit 40. An image example when an image of a front side of a 10-yen coin is input to the image verifying apparatus 1 is shown in the figure. Performing the above edge normalization process on a trimmed image 24 generates an edge-normalized image 33, and rotating the template image by the above matching processing generates a rotated template image 51. In the explanation hereinafter, the edge-normalized image (front side) 33 will be used instead of the edge-normalized image (back side) 32.

Although the matching processing unit 40 obtains the rotation angle with which the coincidence is maximized by rotating the template image in the above explanation, the matching processing unit 40 can also obtain the rotation angle with which the coincidence is maximized by rotating the edge-normalized image 32 without rotating the template image.

Referring back to FIG. 1, the registered-image storing unit 50 will be explained. The registered-image storing unit 50 stores therein a plurality of template images corresponding to various types of coins registered in advance, and provides the template images to the matching processing unit 40. For each of the template images, an average image obtained by synthesizing a plurality of images of coins of the same type is employed to suppress a fluctuation due to an individual difference of the coin. By using the average image of the coin, because a correlation value between a unique relief pattern of each of the coins such as a year of manufacture and a corresponding portion of the template image becomes a correlation value with the average image (average value), an influence of the individual difference at the time of verification hardly comes out. In other words, it is possible to prevent that a coin is determined to be a counterfeit coin because the year of manufacture is different in spite that the coin is an authentic coin.

The template image is edge-normalization processed in the same way as the input image, to be matched with edge-normalization processed input image, and registered to the registered-image storing unit 50. In the registered-image storing unit 50, a plurality of images of a front side and a back side of various types of coins on which the edge-normalization process is performed are registered.

The positive-negative-separated-correlation determining unit 100 receives the edge-normalized image 33 (hereinafter, "an input image 33") and the rotated template image 51 (hereinafter, "a template image 51") shown in FIG. 6 from the matching processing unit 40, performs a verification determination whether the coin corresponding to the input image 33 is an authentic coin by matching the images, and outputs a result of the determination.

The normalized-correlation-value calculating unit 110 calculates a correlation value for each pixel corresponding to the input image 33 and the template image 51, and generates a normalized-correlation-value image by normalizing the correlation value. Specifically, the normalized-correlation-value calculating unit 110 calculates a normalized-correlation value r(x, y) of each pixel by using a tone value s(x, y) of the input image 33 and a tone value t(x, y) of the template image 51 for each pixel having coordinates value of (x, y), using

[Numerical Expression 3]

$$r(x, y) = \frac{\left(t(x, y) - \frac{\sum t}{n}\right)\left(s(x, y) - \frac{\sum s}{n}\right)}{\sqrt{\left\{\sum t^2 - \frac{(\sum t)^2}{n}\right\} \cdot \left\{\sum s^2 - \frac{(\sum s)^2}{n}\right\}}} \quad (4)$$

The normalized-correlation value r(x, y) of each pixel represented by Equation (4) is, for example, in a range of −1.0 to +1.0. A parameter "n" in Equation (4) indicates the number of pixels.

The normalized-correlation-value calculating unit 110 separates the normalized-correlation-value image into a positive-normalized-correlation-value image (r+ image) and a negative-normalized-correlation-value image (r− image) depending on whether a pixel value of the normalized correlation-value image is equal to or larger than "0". Furthermore, the normalized-correlation-value calculating unit 110 separates the template image 51 into a positive template image (t+ image) and a negative template image (t− image) depending on whether each pixel value is equal to or higher than a threshold ($T_t$).

The pixel value of the r+ image is, for example, in a range of 0.0 to 1.0, and the pixel value of the r− image is, for example, in a range of 0.0 to 1.0, by taking an absolute value of each pixel value. In addition, pixel values of the t+ image and the t− image are, for example, a binary value of "0" or "1".

In other words, the t+ image and the t− image have a role of an image mask used for an image conversion of each normalized-correlation-value image.

The meanings of the images are as follows. The r+ image indicates pixels having a correlation between the images to be verified (the images are similar), taking a large value with a strong correlation. The r− image indicates that there is no correlation between the images to be verified (the images are not similar), taking a large value with a strong negative correlation. The t+ image indicates an edge portion of the template image, taking "1" for the edge portion and "0" for the background portion. The t− image indicates the background portion (other than the edge) of the template image, taking "1" for the background portion and "0" for the edge portion.

The positive-negative-separated-correlation-image generating unit 120 generates a positive-negative-separated correlation image by combining the r+ image and the r− image with the t+ image and the t− image generated by the normalized-correlation-value calculating unit 110. Specifically, The positive-negative-separated-correlation-image generating unit 120 generates an A+ area image from the r+ image and the t+ image, an A− area image from the r− image and the t+ image, a B+ area image from the r+ image and the t− image, and a B− area image from the r− image and the t− image.

Figures 7, 8:
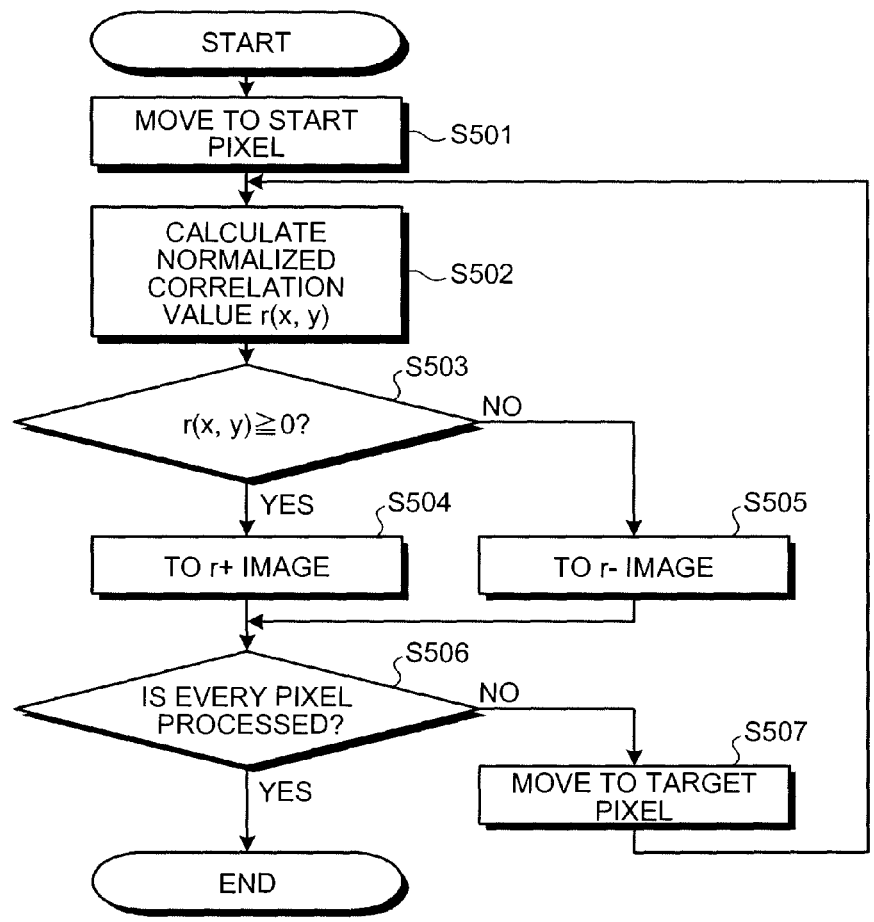
FIG. 7 is a schematic diagram for explaining a feature area and a background area generated by a positive-negative-separated-correlation-image generating unit according to the first embodiment.
FIG. 8 is a flowchart of a normalized-correlation-value positive-negative separating process according to the first embodiment.

The meanings of the area images are as follows. FIG. 7 is a schematic diagram for explaining the four areas. As shown in the figure, the A+ area image is an area image obtained by superposing the r+ image and the t+ image, indicating that there is a correlation with the edge portions, which means that an edge comes out in a right place where the edge should come out, corresponding to a positive feature area image in the claims. The A− area image an area image obtained by superposing the r− image and the t+ image, indicating that there is no correlation with the edge portions, which means that an edge does not come out in the right place where the edge should come out, corresponding to a negative feature area image in the claims. The B+ area image is an area image obtained by superposing the r+ image and the t− image, indicating that there is a correlation with the background portions, which means that an edge does not come out in a wrong place where the edge should not come out, corresponding to a positive background area image in the claims. The B− area image is an area image obtained by superposing the r− image and the t− image, indicating that there is no correlation with the background portions, which means that an edge comes out in the wrong place where the edge should not come out, corresponding to a negative background area image in the claims.

Referring back to FIG. 1, the expansion processing unit 130 will be explained. The expansion processing unit 130 moves pixels of the A− area image to the A+ area image, and moves pixels of the B− area image to the B+ area image, by using a predetermined image mask. The expansion process is performed because a noise-like isolated point having a negative correlation value appears in the normalized correlation value. In other words, by performing the expansion process, it is possible to suppress an influence of the isolated point from affecting a result of determination of the verification value.

The verification-value calculating unit 140 divides each of the A+ area image, A− area image, B+ area image, and the B− area image into 16 blocks of horizontal 4 blocks and vertical 4 blocks, and calculates a verification value (Z) by using

[Numerical Expression 4]

$$Z = \sum_{j=0}^{3} \sum_{i=0}^{3} (a_{ij} A_{ij}^+ + b_{ij} A_{ij}^- + c_{ij} B_{ij}^+ + d_{ij} B_{ij}^-) \quad (5)$$

For coefficients $a_{ij}$, $b_{ij}$, $c_{ij}$, and $d_{ij}$, optimum values are obtained by a linear discriminant analysis using a learning sample. Each of block values of the area images $A^+_{ij}$, $A^-_{ij}$, $B^+_{ij}$, and $B^-_{ij}$ indicates a total sum of pixel values in each corresponding block.

The verification-value calculating unit 140 determines that a coin corresponding to the input image 33 is an authentic coin if the verification value (Z) is equal to or larger than a threshold, otherwise, determines that the coin is a counterfeit coin, and outputs a result of the determination.

A process of the positive-negative-separated-correlation determining unit 100 shown in FIG. 1 will be explained in detail. First, a normalized-correlation-value positive-negative separating process performed by the normalized-correlation-value calculating unit 110 will be explained with reference to FIGS. 8 and 11. FIG. 8 is a flowchart of the normalized-correlation-value positive-negative separating process, and FIG. 11 is a schematic diagram for explaining an image generation procedure in the positive-negative-separated-correlation determining unit 100.

Figure 11:
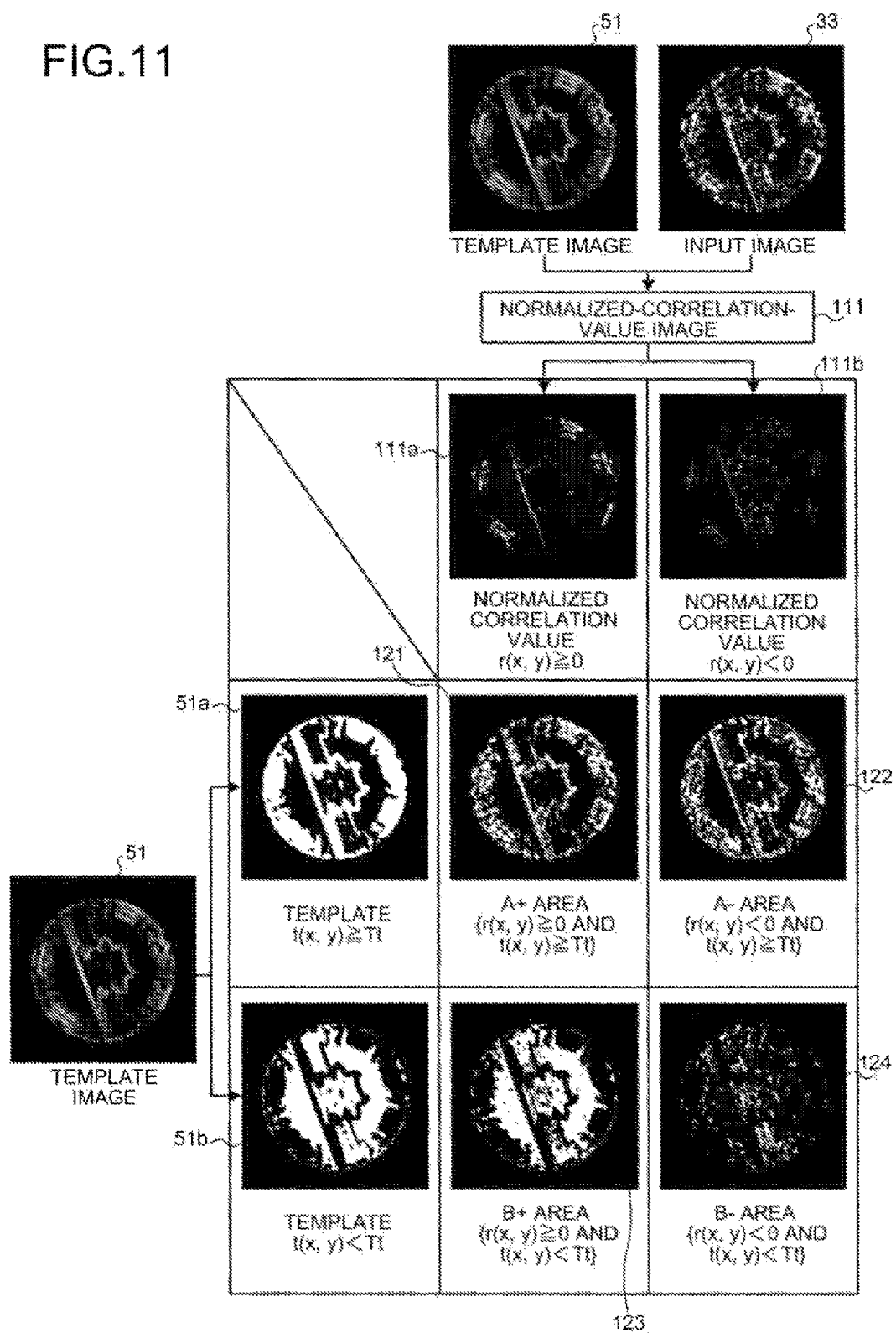
FIG. 11 is a schematic diagram for explaining an image generation procedure corresponding to each area shown in FIG. 7.

As shown in FIG. 11, the normalized-correlation-value calculating unit 110 generates a normalized-correlation-value image 111 from the input image 33 and the template image 51. After that, the normalized-correlation-value calculating unit 110 performs the normalized-correlation-value positive-negative separating process using generated normalized-correlation-value image 111 as an input, and separates the normalized-correlation-value image 111 into an r+ image 111a that is a positive-correlation-value image and an r− image 111b that is a negative-correlation-value image.

As shown in FIG. 8, in the normalized-correlation-value positive-negative separating process, the process first moves to a start pixel of the normalized-correlation-value image 111 (step S501). The start pixel is, for example, a pixel of x=0 and y=0. Then, the normalized correlation value r(x, y) of the pixel is calculated by Equation (4) (step S502), and if calculated r(x, y) is equal to or larger than "0" (Yes at step S503), the pixel value is set to a pixel value of the same coordinates as the r+ image 111a (step S504). On the other hand, if the calculated r(x, y) is smaller than "0" (No at step S503), an absolute value of the pixel value is set to a pixel value of the same coordinates as the r− image 111b (step S505).

When the positive-negative separating process is not completed for all of the pixels of the normalized-correlation-value image 111 (No at step S506), the process moves to the next target pixel (step S507), and the processes from the step S502 are repeated. On the other hand, when the positive-negative separating process is completed for all of the pixels (Yes at step S506), the process is terminated. In the normalized-correlation-value positive-negative separating process, each of the r+ image 111a and the r− image 111b is generated as an image having a pixel value in a range of 0.0 to 1.0. Although the pixel value of the r− image 111b is explained to have the pixel value in the range of 0.0 to 1.0 in the first embodiment, the pixel value can take a value in a range of −1.0 to 0.0.

A template-image positive-negative separating process performed by the normalized-correlation-value calculating unit 110 will be explained with reference to FIGS. 9 and 11.

Figure 9:
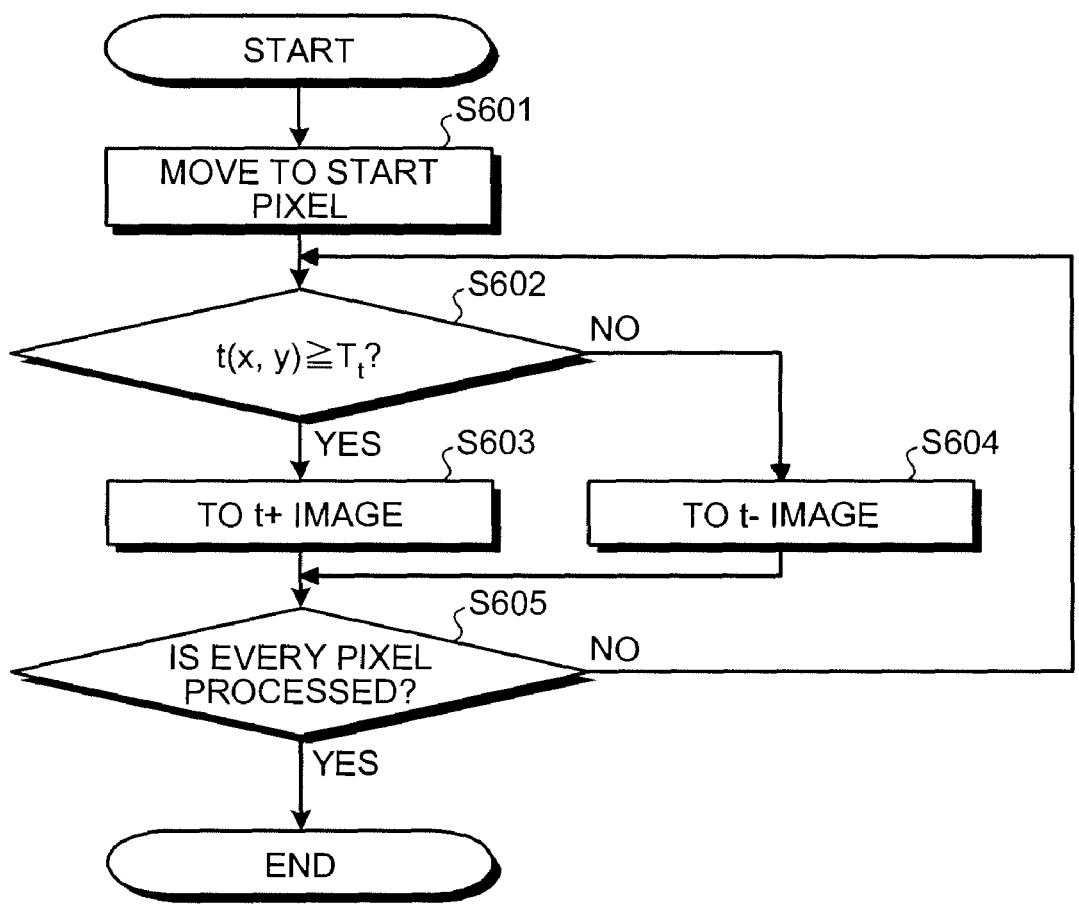
FIG. 9 is a flowchart of a template-image positive-negative separating process according to the first embodiment.

FIG. 9 is a flowchart of the template-image positive-negative separating process. As shown in FIG. 11, in the template-image positive-negative separating process, the template image 51 is separated into a t+ image 51a that is a positive template image and a t− image 51b that is a negative template image.

As shown in FIG. 9, in the template-image positive-negative separating process, the process first moves to a start pixel of the template image 51 (step S601). The start pixel is, for example, a pixel of x=0 and y=0. Then, if a tone value of the pixel is equal to or larger than the threshold ($T_t$) (Yes at step S602), a pixel value of the same coordinates as the t+ image 51a is set to "1" (step S603). On the other hand, if the tone value is smaller than the threshold ($T_t$) (No at step S602), a pixel value of the same coordinates as the t− image 51b is set to "1" (step S604).

When the positive-negative separating process is not completed for all of the pixels of the template image 51 (No at step S605), the process moves to the next target pixel (step S606), and the processes from the step S602 are repeated. On the other hand, when the positive-negative separating process is completed for all of the pixels (Yes at step S605), the process is terminated. By the template-image positive-negative separating process, the t+ image 51a is generated as a binary image with the edge portion set to "1" and the background portion set to "0", and the t− image 51b is generated as a binary image with the edge portion set to "0" and the background portion set to "1".

Figure 10:
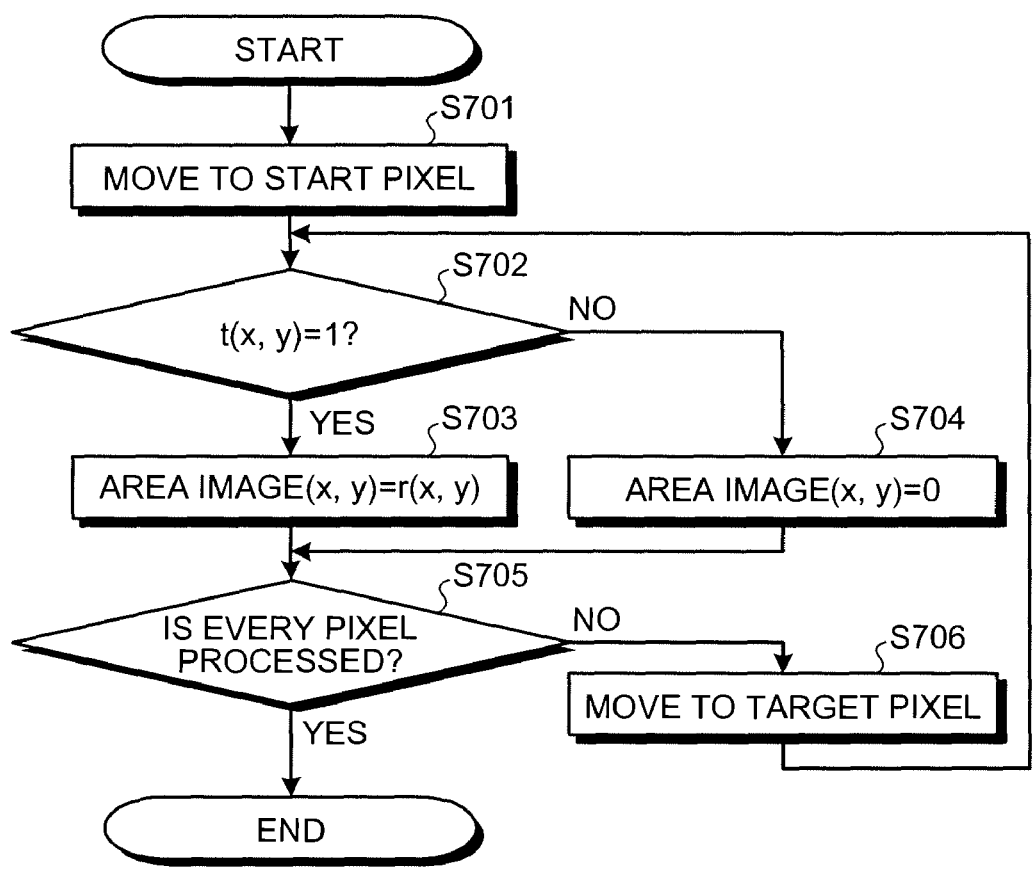
FIG. 10 is a flowchart of a processing procedure of the positive-negative-separated-correlation-image generating unit according to the first embodiment.

A positive-negative-separated-correlation-image generating process performed by the positive-negative-separated-correlation-image generating unit 120 will be explained with reference to FIGS. 10 and 11. FIG. 10 is a flowchart of the positive-negative-separated-correlation-image generating process.

As shown in FIG. 11, in the positive-negative-separated-correlation-image generating process, an A+ area image 121, an A− area image 122, a B+ area image 123, and a B− area image 124 are generated using the r+ image 111a, the r− image 111b, the t+ image 51a, and the t− image 51b generated by the normalized-correlation-value calculating unit 110, as an input image.

For instance, when the r+ image 111a and the t+ image 51a are used as the input image, as shown in FIG. 10, the process first moves to a start pixel of each of the images (step S701). If the pixel value of the t+ image 51a in the pixel is "1" (Yes at step S702), the pixel value of the A+ area image 121 is set to the pixel value of the r+ image 111a (step S703). On the other hand, if the pixel value of the t+ image 51a in the pixel is not "1" (in other words, the pixel value is "0") (No at step S702), the pixel value of the A+ area image 121 is set to "0" (step S704).

When the area-image generating process is not completed for all of the pixels (No at step S705), the process moves to the next target pixel (step S706), and the processes from the step S702 are repeated. On the other hand, when the area-image generating process is completed for all of the pixels (Yes at step S705), the process is terminated because the A+ area image 121 is generated.

In the same way, the A− area image 122 is generated from the r− image 111b and the t+ image 51a, the B+ area image 123 is generated from the r+ image 111a and the t− image 51b, and the B− area image 124 is generated from the r− image 111b and the t− image 51b.

Figure 13:
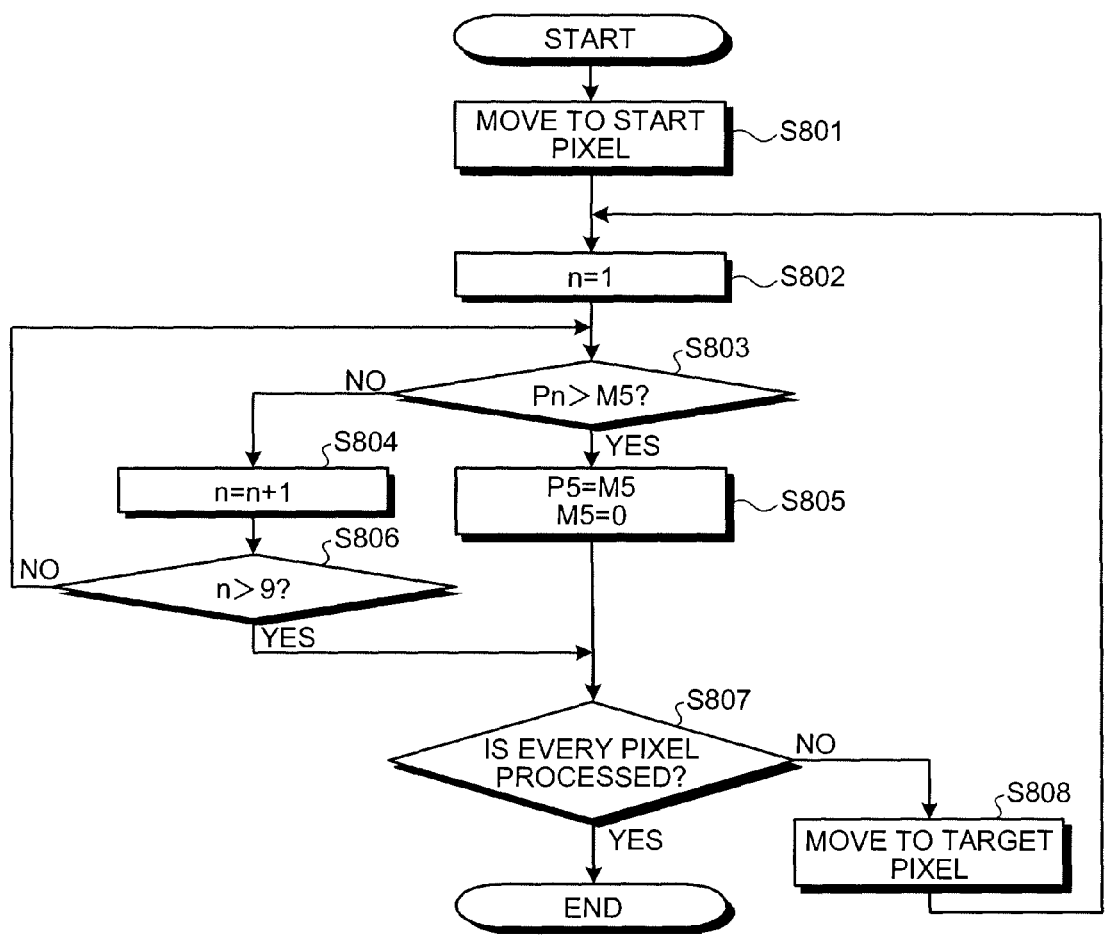
FIG. 13 is a flowchart of a processing procedure of the expansion processing unit according to the first embodiment.
Figure 14:
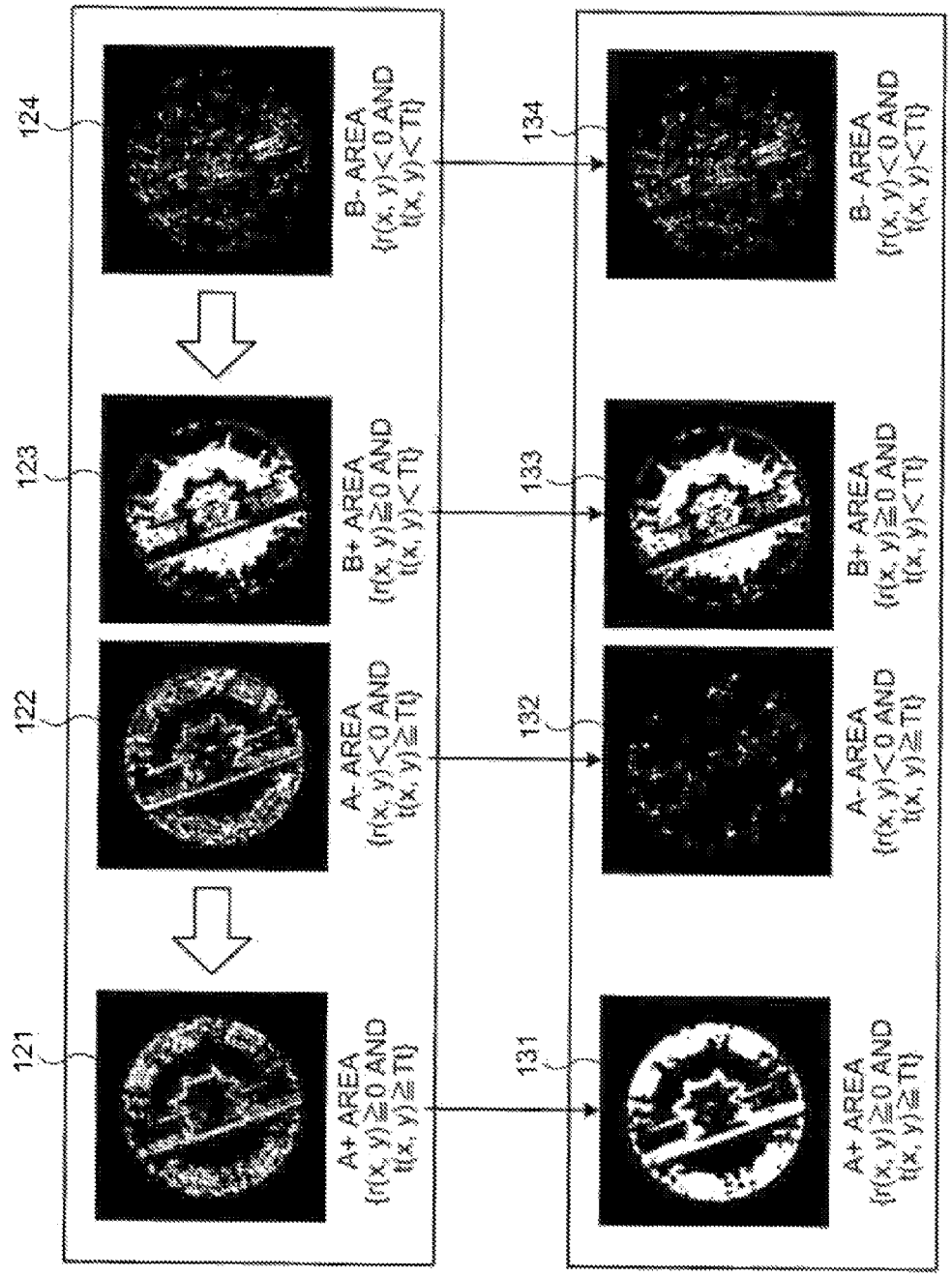
FIG. 14 is a schematic diagram for explaining an image generated by the expansion processing unit according to the first embodiment.

The expansion process performed by the expansion processing unit 130 will be explained with reference to FIGS. 12 to 14. FIG. 12 is a schematic diagram for explaining an image mask used in the expansion process, FIG. 13 is a flowchart of the expansion process, and FIG. 14 is a schematic diagram for explaining an image generated by the expansion process.

In the expansion process, the noise-like isolated point (pixel) included in a negative area image (the A− area image 122 and the B− area image 124) is moved to a positive area image (the A+ area image 121 and the B+ area image 123). By performing the above process, it is possible to enhance the precision of the verification value.

As shown in FIG. 12, in the expansion process, two image masks, a positive-area image mask 130a and a negative-area image mask 130b, are used. The positive-area image mask 130a and the negative-area image mask 130b include a P5 and an M5 with eight areas surrounding the P5 and the M5, respectively. For instance, when performing the expansion process from the A− area image 122 to the A+ area image 121, the M5 of the negative-area image mask 130b is set to a target pixel of the A− area image 122, and the P5 of the positive-area image mask 130a is set to a pixel corresponding to the target pixel. After that, the expansion process is performed by sequentially comparing the pixel value of the M5 with pixel values of P1 to P9.

A processing procedure of the expansion process will be explained with a case in which the expansion process is performed from the A− area image 122 to the A+ area image 121, with reference to FIG. 13. The process first moves to a start pixel of each of the images (121 and 122) (step S801). The start pixel is, for example, a pixel of x=0 and y=0. Then, "1" is set to "n" for sequentially switching the nine areas of the positive-area image mask 130a (P1 to P9) (step S802). Namely, at the time of completing the step S802, the target area of the positive-area image mask 130a is the P1.

The value of the Pn is compared with the value of the M5, and if the value of the P1 is larger than the value of the M5 (Yes at step S803), the value of the P5 is replaced by the value of the M5 and "0" is set to the value of the M5 (step S805). In other words, the pixel of the M5 is moved to the pixel of the P5. On the other hand, if the value of the Pn is equal to or smaller than the value of the M5 (No at step S803), "1" is added to the value of "n" (step S804), and if the value of "n" is equal to or smaller than "9" (No at step S806), the step S803 is performed again.

In this manner, if any one of the P1 to P9 is larger than the M5, the pixel of the M5 is moved to the pixel of the P5. On the other hand, if values of all of the P1 to P9 are equal to or smaller than the value of the M5 (Yes at step S806), the movement of the pixel is not performed.

When the process is not completed for all of the pixels of the A− area image 122 (No at step S807), the process moves to the next target pixel (step S808), to perform the processes after the step S802. On the other hand, when the process is completed for all of the pixels of the A− area image 122 (Yes at step S807), the expansion process is terminated.

As shown in FIG. 14, by the expansion process, the A+ area image 121, the A− area image 122, the B+ area image 123, and the B− area image 124 are converted into an expanded A+ area image 131, an expanded A− area image 132, an expanded B+ area image 133, and an expanded B− area image 134, respectively. Because the isolated point on the A− area image 122 is moved to the A+ area image 121, a dimension of the edge portion of the expanded A+ area image 131 is increased, compared to the A+ area image 121. On the other hand, a dimension of the edge portion of the expanded A− area image 132 is decreased, compared to the A− area image 122.

Figure 15:
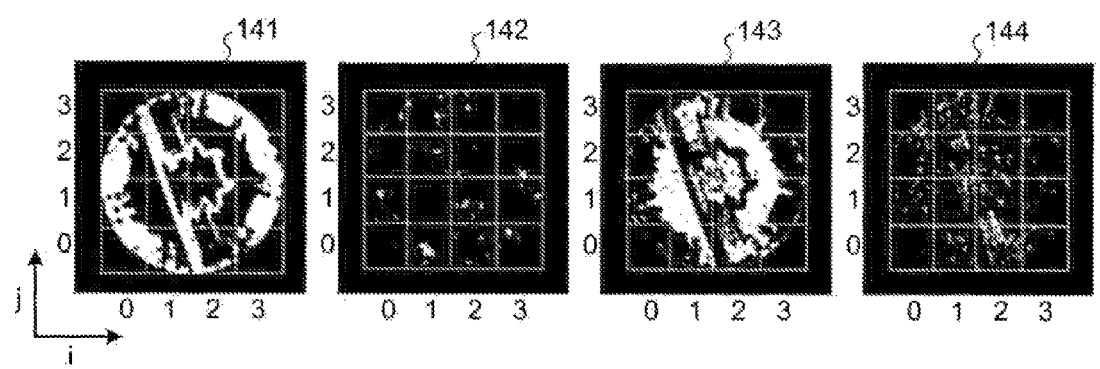
FIG. 15 is a schematic diagram for explaining a block segmentation of an image used in a verification-value calculating unit according to the first embodiment.

A verification-value calculating process performed by the verification-value calculating unit 140 will be explained with reference to FIG. 15. FIG. 15 is a schematic diagram for explaining a block segmentation of the expanded area images (131 to 134). As shown in the figure, the verification-value calculating unit 140 first segments each of the expanded area images (131 to 134) into 16 blocks of horizontal 4 blocks and vertical 4 blocks, and generates an A+ area image block 141, an A− area image block 142, a B+ area image block 143, and a B− area image block 144.

After that, the verification-value calculating unit 140 calculates the verification value (Z) by using Equation (5). For coefficients $a_{ij}$, $b_{ij}$, $c_{ij}$, and $d_{ij}$ in Equation (5), optimum values are obtained by a linear discriminant analysis using a learning sample. Specifically, the coefficients take different values for different types of the coins, because there are coins from which the edge easily comes out and coins from which the edge hardly comes out due to a difference of the relief pattern of the coin. By optimizing the coefficients with the learning sample, it is possible to perform the image verification with high precision.

The verification-value calculating unit 140 calculates the verification value (Z) by using the coefficients $a_{ij}$, $b_{ij}$, $c_{ij}$, and $d_{ij}$ for which the optimum values are set and each of the blocks (141 to 144), determines that the coin is an authentic coin if the verification value is equal to or larger than a threshold, and determines that the coin is a counterfeit coin if the verification value is smaller than the threshold. Although a case in which the image is segmented into the 16 blocks is explained in the first embodiment, the number of blocks can be set to an arbitrary number.

In addition, if the coefficients $c_{ij}$ and $d_{ij}$ are set to "0" in Equation (5), the verification value (Z) can be calculated only from the A+ area image block 141 and the A− area image block 142. On the other hand, if the coefficients $a_{ij}$ and $b_{ij}$, $c_{ij}$ are set to "0", the verification value (Z) can be calculated only from the B+ area image block 143 and the B− area image block 144.

In this manner, the verification-value calculating unit 140 can efficiently perform the image verification by adjusting the number of image blocks and values of the coefficients in Equation (5) according to the type of the coin or a performance of hardware.

Although, in the verification-value calculating unit 140 according to the first embodiment, the verification value (Z) is calculated by Equation (5) after block segmenting each of the area images, the configuration is not limited to the above scheme, but can be configured in such a manner that the verification determination is performed by other method. For instance, other methods, such as a multilayer neural network, a support vector machine, and a secondary discriminant function, can be employed.

Figure 16:
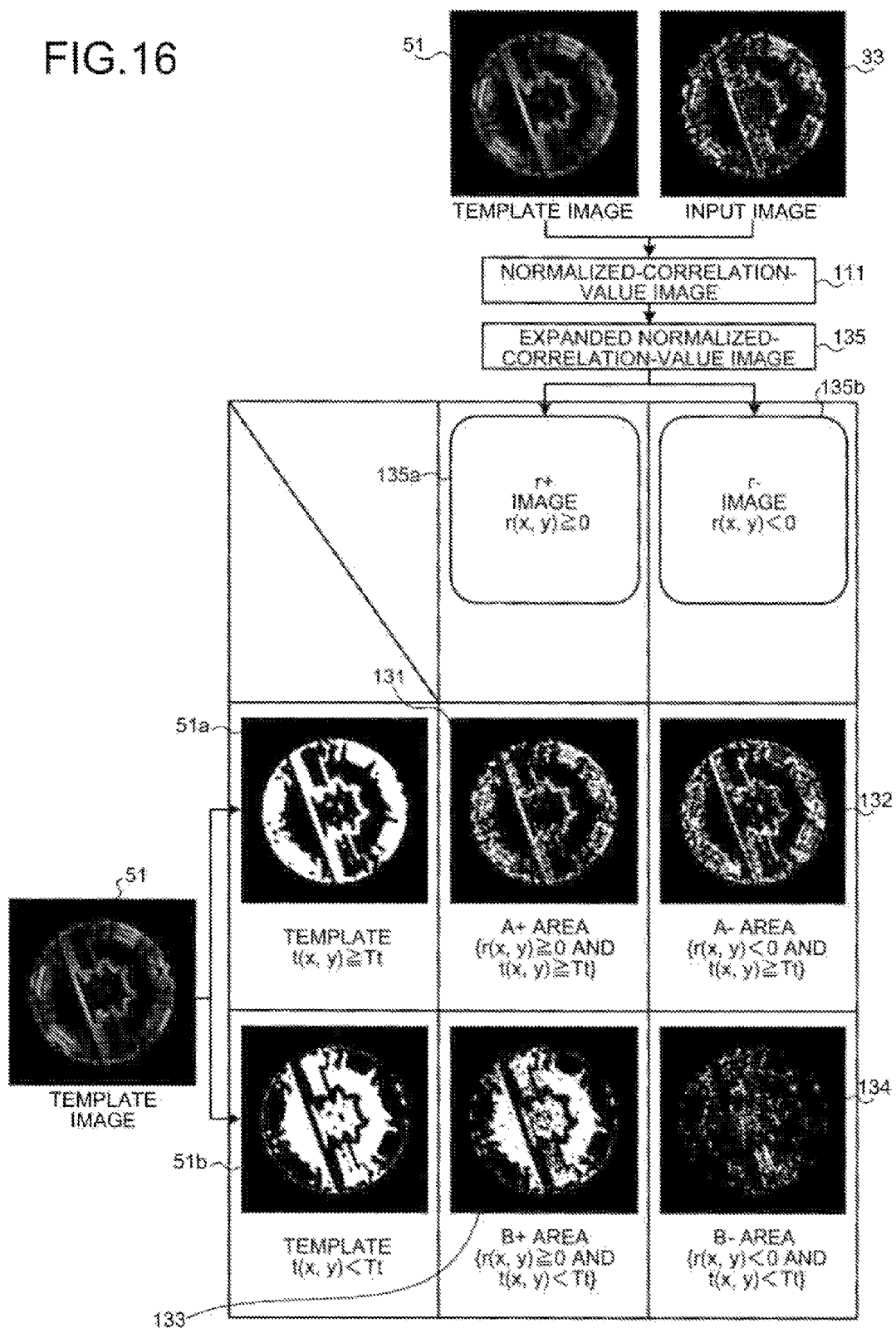
FIG. 16 is a schematic diagram for explaining a modification example of an expansion process according to the first embodiment.
Figure 18:
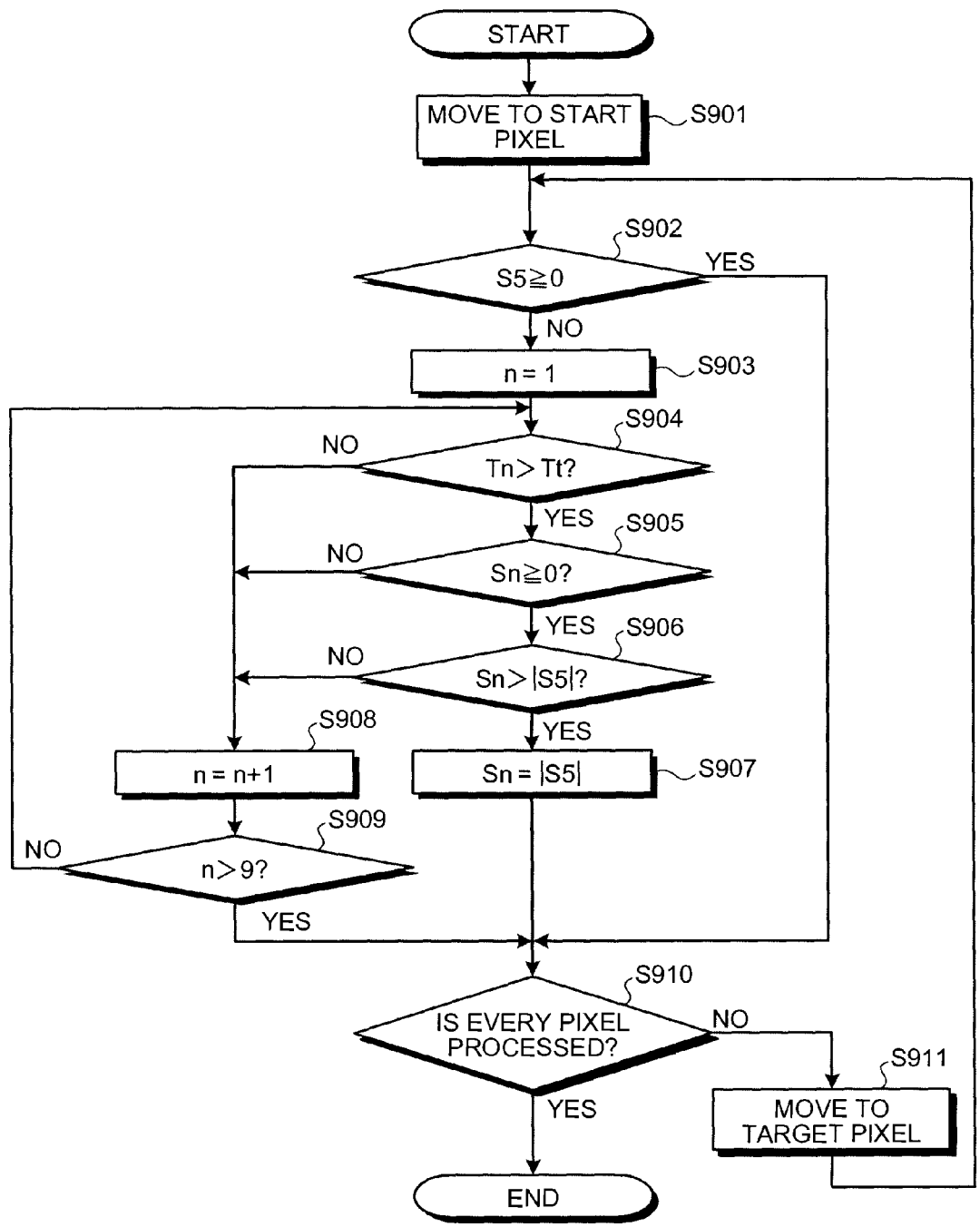
FIG. 18 is a flowchart of a processing procedure of an expansion processing unit according to the modification example shown in FIG. 16.

A case in which the expansion process is performed before positive-negative separating the normalized-correlation-value image 111 will be explained with reference to FIGS. 16 to 18. FIG. 16 is a schematic diagram for explaining an image generating procedure by the expansion process, FIG. 17 is a schematic diagram for explaining an image mask used in the expansion process, and FIG. 18 is a flowchart of the expansion process.

In the above-described expansion process, the pixel is moved from the negative area image (for example, the A− area image 122) to the positive area image (for example, the A+ area image 121) after generating each of the area images (121 to 124). However, the expansion process can be performed using the normalized-correlation-value image 111 before the positive-negative separation and the template image 51 before the positive-negative separation.

As shown in FIG. 16, the normalized-correlation-value calculating unit 110 first generates the normalized-correlation-value image 111 from the input image 33 and the template image 51. Then, the expansion process is performed by using generated normalized-correlation-value image 111 as an input, to generate an expanded normalized-correlation-value image 135. The expanded normalized correlation-value image 135 is separated into an expanded r+ image 135a and an expanded r− image 135b. Subsequently, a process of the positive-negative-separated-correlation-image generating unit 120 is performed by using the expanded r+ image 135a, the expanded r− image 135b, the t+ image 51a and the t− image 51b as an input, and the expanded A+ area image 131, the expanded A− area image 132, the expanded B+ area image 133, and the expanded B− area image 134 are output.

As shown in FIG. 17, in the expansion process, two image masks, an input image mask 130c and a template image mask 130d, are used. The input image mask 130c and the template image mask 130d include S5 and T5 with eight areas surrounding S5 and T5, respectively. For instance, when performing the expansion process by using the template image 51 and the normalized-correlation-value image 111, S5 of the input image mask 130c is set to a target pixel of the normalized-correlation-value image, and T5 of the template image mask 130d is set to a pixel corresponding to the target pixel. After that, the expansion process is performed by comparing pixel values of areas of S1 to S9 and T1 to T9.

A processing procedure of the expansion process will be explained with reference to FIG. 18. The process first moves to a start pixel of each of the images (111 and 51) (step S901). The start pixel is, for example, a pixel of x=0 and y=0. If the value of S5 is negative, in other words, if the normalized correlation value of the pixel is negative (No at step S902), "1" is set to "n" for sequentially switching the nine areas (S1 to S9) of the input image mask 130c and the nine areas (T1 to T9) of the template image mask 130d (step S903).

If the value of Tn is larger than the threshold ($T_t$) (Yes at step S904), it is determined whether the value of Sn is equal to or larger than "0" (step S905), and if the value of Sn is equal to or larger than "0" (Yes at step S905), the value of Sn is compared with an absolute value of S5 (step S906). If the value of Sn is larger than the absolute value of S5 (Yes at step S906), the value of Sn is replaced by the absolute value of S5 (step S907).

In other words, when there is an area (Sn) in which the value of Tn is larger than the threshold ($T_t$), the value of Sn is equal to or larger thank "0", and the value of Sn is larger than the absolute value of Sn in the areas Sn around S5, the pixel of S5 is determined to be an isolated point, and the value of S5 is inverted with the absolute value of S5. Then, if the expansion process is not completed for all of the pixels of the normalized-correlation-value image 111 (No at step S910), the process moves to the target pixel (step S911), and the processes from the step S902 are repeated. On the other hand, when the expansion process is completed for all of the pixels (Yes at step S910), the expansion process is terminated.

On the other hand, if the value of Tn is equal to or smaller than the threshold ($T_t$) (No at step S904), the value of Sn is negative (No at step S905), or the value of Sn is equal to or smaller than the absolute value of S5 (No at step S906), "1" is added to the value of "n" (step S908), and if the value of "n" is equal to or smaller than "9" (No at step S909), the processes from the step S904 are repeated. On the other hand, if the value of "n" is larger than "9" (Yes at step S909), the process of the step S910 is performed.

In this manner, even when the expansion process is performed before positive-negative separating the normalized-correlation-value image 111, it is possible to obtain the expanded area images (131 to 134). In this case, because the normalized-correlation-value image 111 before the positive-negative separation is used, the number of images for the expansion process can be reduced, compared to the expansion process after generating the area images (121 to 124), and it is possible to perform the expansion process more efficiently.

As describe above, in the image verifying apparatus, the image verifying method, and the image verifying program according to the first embodiment, an input image on which the feature extraction is performed by executing the edge extracting process and the edge normalizing process is matched with a template image on which the edge normalizing process is performed in advance, and the normalized-correlation-value image is generated. The normalized-correlation-value image is separated into a positive-normalized-correlation-value image and a negative-normalized-correlation-value image, and the template image is separated into a positive template image and a negative template image, depending on whether the pixel value in each of the images is equal to or larger than a threshold, and by combining the images, a positive feature area image, a negative feature area image, a positive background area image and a negative background area image are generated. Furthermore, an expansion process is performed in which a movement of a pixel from the negative feature area image to the positive feature area image and a movement of a pixel from the negative background area image to the positive background area image are performed, and a verification determination is performed by calculating a verification value by the linear discriminant analysis by block segmenting the expanded area images. Therefore, it is possible to take all of the pixels of the input image and the template image as a target of the verification, and to reflect not only the correlation value of the feature area but also the correlation value of the background area on the verification value in a well-balanced manner, while removing an influence of the isolated point accompanied by the calculation of the correlation value. As a result, an image verification with a high precision can be performed, and it is possible to enhance the verification rate of the image.

Although, a case in which the image verification is performed for an input image of a coin is explained in the first embodiment, the present invention is not limited to the above scheme, but can be applied to, for example, an image verification of a paper currency or an image verification of a part or a product in a factory automation (FA) process.

Second Embodiment

According to the first embodiment, an image verification of a coin is explained by employing a Cartesian coordinate system. According to a second embodiment of the present invention, an image verification employing a polar coordinate system instead of the Cartesian coordinate system will be explained. By employing the polar coordinate system, an image verification of a circular object such as the coin can be performed more efficiently.

Figure 19:
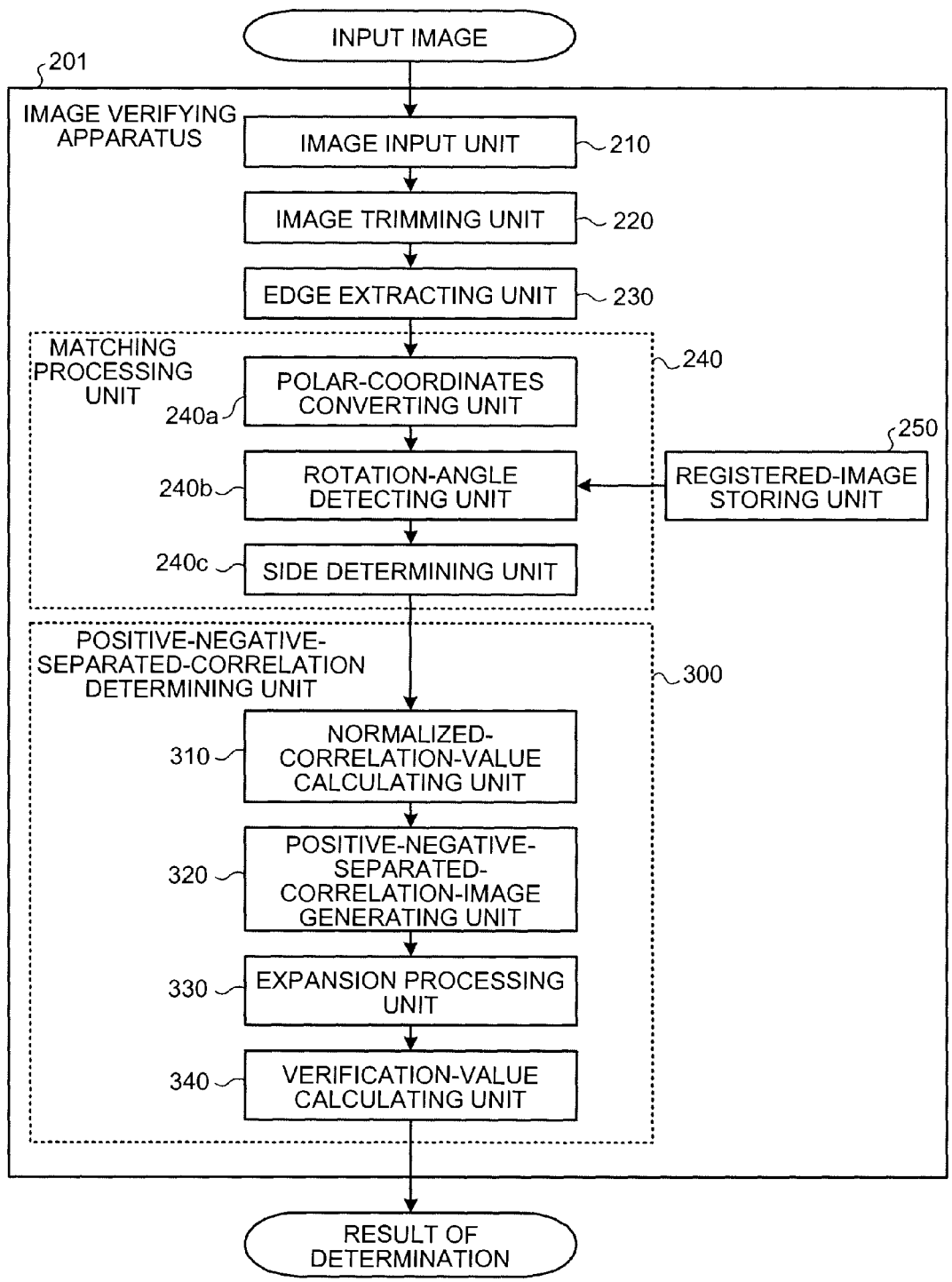
FIG. 19 is a functional block diagram for explaining a configuration of an image verifying apparatus according to a second embodiment of the present invention.

FIG. 19 is a functional block diagram for explaining a configuration of an image verifying apparatus according to the second embodiment. As shown in the figure, an image verifying apparatus 201 includes an image input unit 210, an image trimming unit 220, an edge extracting unit 230, a matching processing unit 240, a registered-image storing unit 250, and a positive-negative-separated-correlation determining unit 300. The matching processing unit 240 includes a polar-coordinates converting unit 240a, a rotation-angle detecting unit 240b, and a side determining unit 240c. The positive-negative-separated-correlation determining unit 300 includes a normalized-correlation-value calculating unit 310, a positive-negative-separated-correlation-image generating unit 320, an expansion processing unit 330, and a verification-value calculating unit 340.

The image input unit 210 is an input unit to import an input image of a coin that is a target of a verification into the apparatus, which outputs imported input image to the image trimming unit 220. The image input unit 210 treats the input image as a collective entity of a predetermined number of pixels. For instance, the image input unit 210 recognizes the input image as a grey-scale image having a tone value of 256 gradation levels, and outputs the input image to the image trimming unit 220 as a rectangular image of a predetermined size.

The image trimming unit 220 receives the rectangular image from the image input unit 210, trims a portion of the image in a square area that circumscribes the coin image, and outputs trimmed image to the edge extracting unit 230.

FIG. 20 is a schematic diagram for explaining a processing outline of the image trimming unit 220. As shown in the figure, the image trimming unit 220 scans an input image 211 in a horizontal direction to accumulate tone values of all pixels, and generates a horizontal projection 221. In addition, the image trimming unit 220 scans the input image 211 in a vertical direction, and generates a vertical projection 222 in the same procedure. After that, the image trimming unit 220 scans the horizontal projection 221 and the vertical projection 222, and calculates rising coordinates and falling coordinates of accumulated tone values. As indicated by four broken lines shown in the figure, the image trimming unit 220 trims an area surrounded by calculated coordinates as a trimmed image 223, and outputs the trimmed image 223 to the edge extracting unit 230.

Referring back to FIG. 19, the edge extracting unit 230 will be explained. The edge extracting unit 230 receives the trimmed image 223 from the image trimming unit 220, and calculates a tone change (edge strength) of the trimmed image 223 to avoid an influence caused by individual difference of the trimmed image 223, such as brightness and hue. In addition, the edge extracting unit 230 performs a normalization of the edge strength to suppress a fluctuation of calculated edge strength. Specifically, the edge extracting unit 230 calculates the edge strength by performing an edge extracting process using a Sobel operator on the trimmed image 223, and normalizes a result of the calculation. Although the Sobel operator is employed in the second embodiment, it is also possible to extract the edge by using a Roberts operator and the like.

FIG. 21 is a schematic diagram for explaining the Sobel operator. As shown in the figure, the edge extracting unit 230 performs a calculation of the edge strength by using two Sobel operators, a Sobel operator for horizontal edge calculation 230a and a Sobel operator for vertical edge calculation 230b. Specifically, the edge extracting unit 230 scans each of the Sobel operators (230a and 230b) for all pixels of the trimmed image 223, and obtains a horizontal edge-calculation result Gx and a vertical edge-calculation result Gy. After that, the edge extracting unit 230 calculates the edge strength (G) in each of the pixels, and then normalizes (E) the edge strength.

[Numerical Expression 5]

$$G = |G_x| + |G_y| \quad (6)$$

$$E = c \times \frac{G}{\sum G} \quad (7)$$

As expressed by Equation (6), the edge strength (G) in each of the pixels is represented by a sum of an absolute value of the horizontal edge-calculation result Gx and an absolute value of the vertical edge-calculation result Gy. The normalized edge strength (E) is, as expressed by Equation (7), obtained by dividing a product of the edge strength (G) and a constant c that is a predetermined value set for a type of the coin by a total sum of the edge strengths (G) of all of the pixels.

In this manner, by performing the normalization of the edge strength, it is possible to suppress an occurrence of a fluctuation of the edge strength between a coin from which the edge can be easily extracted and a coin from which the edge can be hardly extracted, and as a result, a verification of various types of coins can be performed with a high precision.

Figure 22:
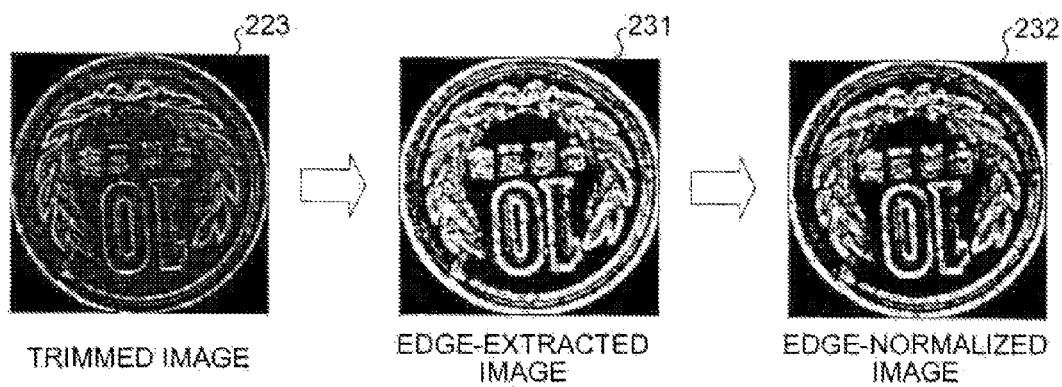
FIG. 22 is a schematic diagram for explaining a processing outline of the edge extracting unit shown in FIG. 19.

FIG. 22 is a schematic diagram for explaining an outline of the edge extracting process (image converting process) performed by the edge extracting unit 230. As shown in the figure, the trimmed image 223 is converted into an edge-extracted image 231 by the edge-strength calculating process using the Sobel operator. After that, the edge-extracted image 231 is converted into an edge-normalized image 232 by the edge-strength normalizing process using Equations (6) and (7). The edge extracting unit 230 outputs the edge-normalized image 232 to the matching processing unit 240.

Each pixel value of the edge-extracted image 231 shown in the figure takes a value of, for example, 0 to 255, which is a grey-scale value with 0 corresponding to black and 255 corresponding to white. In the edge-extracted image 231 shown in the figure, a white portion is an extracted edge portion, and a black portion is a background portion. Each pixel value of the edge-normalized image 232 takes a value of, for example, 0 to 255, which is a grey-scale value with 0 corresponding to black and 255 corresponding to white. In the edge-normalized image 232 in the figure, a white portion is corresponding to an edge portion, and a black portion is corresponding to a background, as in the case with the edge-extracted image 231.

Referring back to FIG. 19, the matching processing unit 240 will be explained. The matching processing unit 240 receives the edge-normalized image 232 from the edge extracting unit 230, and receives an edge-normalized and polar-coordinates-converted template image from the registered-image storing unit 250. After that, the matching processing unit 240 polar-coordinates converts the edge-normalized image 232, detects a deviation angle between the polar-coordinates-converted image and the template image by a parallel shift of the template image, performs a side determination, and outputs the edge-normalized image 232 and deviation-angle-compensated template image to the positive-negative-separated-correlation determining unit 300. Although a case in which the deviation angle is detected by the parallel shift of the template image is explained in the second embodiment, the deviation angle can also be detected by a parallel shift of an image obtained by polar-coordinates converting the edge-normalized image 232.

The polar-coordinates converting unit 240a is a processing unit that polar-coordinates converts the edge-normalized image 232. Specifically, the polar-coordinates converting unit 240a calculates a center point of the edge-normalized image 232, and sets calculated center point as the origin of a polar coordinates. Then, the polar-coordinates converting unit 240a specifies each pixel by a rotation angle θ and a distance ρ from the center point, and performs a polar-coordinates conversion by shifting each pixel to a ρ-θ space. The conversion employs

[Numerical Expression 6]

$$x = \rho \cdot \cos(\theta) \quad (8)$$

$$y = \rho \cdot \sin(\theta) \quad (9)$$

Figure 23:
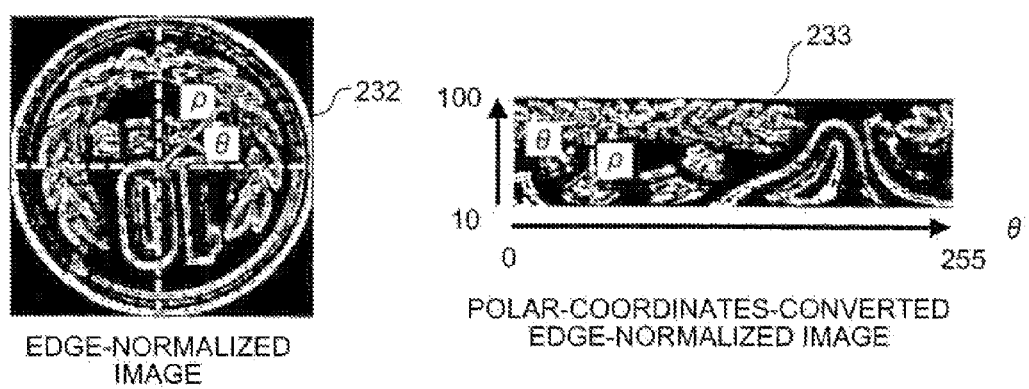
FIG. 23 is a schematic diagram for explaining a processing outline of a polar-coordinates conversion according to the second embodiment.

FIG. 23 is a schematic diagram for explaining a processing outline of the polar-coordinates conversion. When a coordinate of each pixel is represented by (x, y) with the center point of an x-y space (the edge-normalized image 232) as the origin, there are relations expressed as Equations (8) and (9) between the x and y and the ρ and θ. Therefore, the polar-coordinates converting unit 240a generates a polar-coordinates-converted edge-normalized image 233 by converting each pixel (x, y) in the edge-normalized image 232 into a pixel (ρ, θ) that satisfies the relations in Equations (8) and (9).

Although the distance ρ is in a range of 10 to 100, and the rotation angle θ is in a range of 0 to 255 in the figure, the ranges of these values can be set arbitrarily.

Figure 24:
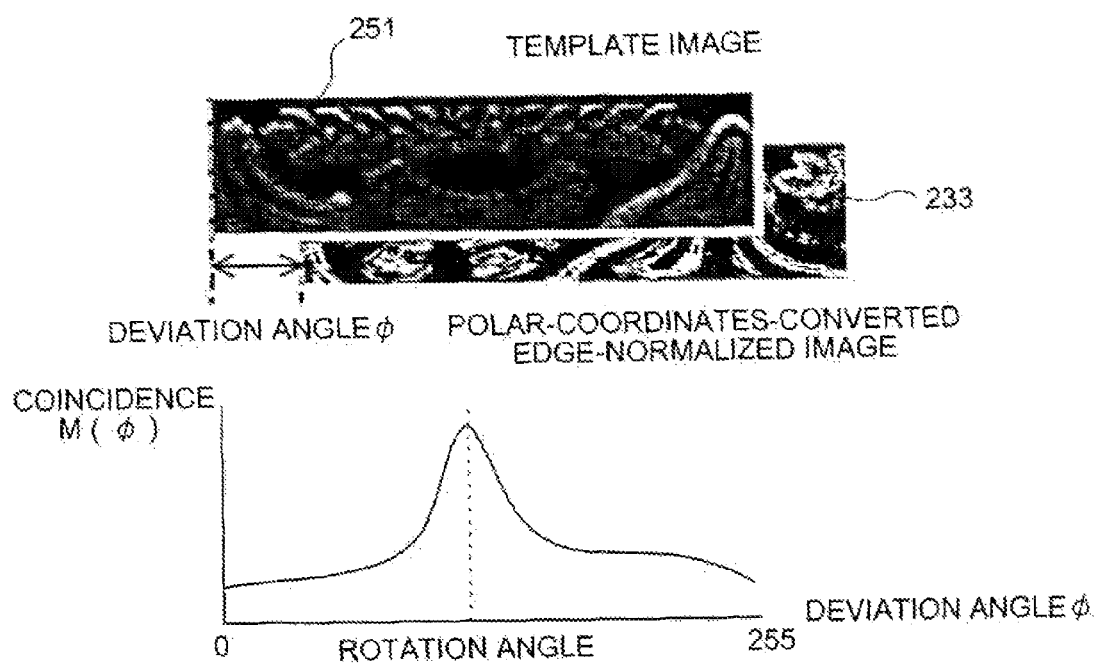
FIG. 24 is a schematic diagram for explaining a processing outline of a rotation-angle detecting unit shown in FIG. 19.

Referring back to FIG. 19, the rotation-angle detecting unit 240b will be explained. The rotation-angle detecting unit 240b detects a deviation angle between the polar-coordinates-converted edge-normalized image 233 and a template image that is polar-coordinates converted in advance by the same polar-coordinates converting process, and performs a process of compensating the deviation angle between the images. FIG. 24 is a schematic diagram for explaining a processing outline of the rotation-angle detecting unit 240b.

As shown in the figure, a template image 251 is shifted in parallel with the coordinate axis in the ρ-θ space. After that, a rotation angle (φ) and a coincidence M(φ) between the template image 251 and the edge-normalized image 232 in each rotation angle (φ) are calculated, and a rotation angle $\phi_{max}$ with which the coincidence M(φ) is maximized is obtained. The coincidence M(φ) is calculated by

[Numerical Expression 7]

$$M(\phi) = \sum_k \sum_{\theta=0}^{255} t(k, \theta - \phi) \cdot s(k, \theta) \quad (10)$$

As expressed by Equation (10), the coincidence M(φ) in each rotation angle (φ) is obtained by taking a total sum of products of a tone value t(k, θ−φ) of each pixel of the template image 251 and a tone value s(k, θ) of each pixel of the edge-normalized image 232 of all of the pixels, when the template image 251 is rotated by an angle φ, where k is a selection value obtained by selecting a distance with which a feature easily comes out from among the distances ρ from the center point in the edge-normalized image 232. For instance, k is selected by extracting 16 values of ρ with which the feature easily comes out from among ρ (0 to 100) of the polar-coordinates-converted edge-normalized image 233 shown in FIG. 23.

A value of M(φ) takes a maximum value at a specific rotation angle, making a graph having a shape of a convex upward, as shown in FIG. 24. The rotation-angle detecting unit 240b acquires a value of $\phi_{max}$ with which the M(φ) is maximized (a peak of the convex). As described above, because the rotation-angle detecting unit 240b compensates the deviation angle by a parallel shift of a ρ-θ image on which the polar-coordinates conversion is performed, it is possible to reduce an amount of calculation, compared to a method of compensating the deviation angle by a rotation of an x-y image.

Referring back to FIG. 19, the side determining unit 240c will be explained. The side determining unit 240c calculates a maximum M($\phi_{max}$) of the coincidence M($\phi$) between polar-coordinates-converted front-side template image and back-side template image and the polar-coordinates-converted edge-normalized image 233, and obtains a normalized correlation coefficient R from M($\phi_{max}$). Specifically, the normalized correlation coefficient R is calculated by

[Numerical Expression 8]

$$R = \frac{\sum_{\theta}\left(t(\theta - \theta_{max}) - \frac{\sum t}{N}\right)\left(s(\theta) - \frac{\sum s}{N}\right)}{\sqrt{\left\{\sum t^2 - \frac{(\sum t)^2}{N}\right\} \cdot \left\{\sum s^2 - \frac{(\sum s)^2}{N}\right\}}} \quad (11)$$

$$= \frac{N \cdot M(\phi_{max}) - \sum t \cdot \sum s}{\sqrt{\{N \cdot \sum t^2 - (\sum t)^2\} \cdot \{N \cdot \sum s^2 - (\sum s)^2\}}}$$

where N is the number of pixels to be determined.

After that, the side determining unit 240c selects a template image having a large normalized correlation coefficient R, and outputs the selected template image with the polar-coordinates-converted edge-normalized image 233 to the positive-negative-separated-correlation determining unit 300. For instance, if the normalized correlation coefficient R of the back-side template image and the polar-coordinates-converted edge-normalized image 233 is larger than the normalized correlation coefficient R of the front-side template image and the polar-coordinates-converted edge-normalized image 233, the side determining unit 240c outputs the back-side template image and the polar-coordinates-converted edge-normalized image 233 to the positive-negative-separated-correlation determining unit 300. The template image output to the positive-negative-separated-correlation determining unit 300 is a template image for which the deviation angle with the polar-coordinates-converted edge-normalized image 233 is compensated by a parallel shifting the template image by the angle $\phi_{max}$.

Referring back to FIG. 19, the registered-image storing unit 250 will be explained. The registered-image storing unit 250 stores therein a plurality of template images corresponding to various types of coins registered in advance, and provides the template images to the matching processing unit 240. For each of the template images, an average image obtained by synthesizing a plurality of images of coins of the same type is employed to suppress a fluctuation due to an individual difference of the coin. By using the average image of the coin, because a correlation value between a unique relief pattern of each of the coins such as a year of manufacture and a corresponding portion of the template image becomes a correlation value with the average image (average value), an influence of the individual difference at the time of verification hardly comes out. In other words, it is possible to prevent that a coin is determined to be a counterfeit coin because the year of manufacture is different in spite that the coin is an authentic coin.

The template image is edge-normalization processed in the same way as the input image, to be matched with edge-normalization processed input image, and registered to the registered-image storing unit 250. In the registered-image storing unit 250, a plurality of images of a front side and a back side of various types of coins on which the edge-normalization process is performed are registered.

Referring back to FIG. 19, the positive-negative-separated-correlation determining unit 300 will be explained. The positive-negative-separated-correlation determining unit 300 receives the edge-normalized image 233 (hereinafter, "an input image 233") and the rotated template image 251 (hereinafter, "a template image 251") shown in FIG. 24 from the matching processing unit 240, performs a verification determination whether the coin corresponding to the input image 233 is an authentic coin by matching the images, and outputs a result of the determination.

The normalized-correlation-value calculating unit 310 calculates a correlation value for each pixel corresponding to the input image 233 and the template image 251, and generates a normalized-correlation-value image by normalizing the correlation value. Specifically, the normalized-correlation-value calculating unit 310 calculates a normalized-correlation value r(k, θ) of each pixel by using a tone value s(k, θ) of the input image 233 and a tone value t(k, θ−$\phi$max) of the template image 251 for each pixel having coordinates value of (k, θ), using

[Numerical Expression 9]

$$r(k, \theta) = \frac{\left(t(k, \theta - \phi_{max}) - \frac{\sum t}{n}\right)\left(s(k, \theta) - \frac{\sum s}{n}\right)}{\sqrt{\left\{\sum t^2 - \frac{(\sum t)^2}{n}\right\} \cdot \left\{\sum s^2 - \frac{(\sum s)^2}{n}\right\}}} \quad (12)$$

The normalized-correlation value r(k, θ) of each pixel represented by Equation (12) is, for example, in a range of −1.0 to +1.0. A parameter "n" in Equation (12) indicates the number of pixels.

The normalized-correlation-value calculating unit 310 separates the normalized-correlation-value image into a positive-normalized-correlation-value image (r+ image) and a negative-normalized-correlation-value image (r− image) depending on whether a pixel value of the normalized-correlation-value image is equal to or larger than "0". Furthermore, the normalized-correlation-value calculating unit 310 separates the template image 251 into a positive template image (t+ image) and a negative template image (t− image) depending on whether each pixel value is equal to or higher than a threshold ($T_t$).

The pixel value of the r+ image is, for example, in a range of 0.0 to 1.0, and the pixel value of the r− image is, for example, in a range of 0.0 to 1.0, by taking an absolute value of each pixel value. In addition, pixel values of the t+ image and the t− image are, for example, a binary value of "0" or "1". In other words, the t− image and the t− image have a role of an image mask used for an image conversion of each normalized-correlation-value image.

The meanings of the images are as follows. The r+ image indicates pixels having a correlation between the images to be verified (the images are similar), taking a large value with a strong correlation. The r− image indicates that there is no correlation between the images to be verified (the images are not similar), taking a large value with a strong negative correlation. The t+ image indicates an edge portion of the template image, taking "1" for the edge portion and "0" for the background portion. The t− image indicates the background portion (other than the edge) of the template image, taking "1" for the background portion and "0" for the edge portion.

The positive-negative-separated-correlation-image generating unit 320 generates a positive-negative-separated correlation image by combining the r+ image and the r− image with the t+ image and the t− image generated by the normalized-correlation-value calculating unit 110. Specifically, The positive-negative-separated-correlation-image generating unit 120 generates an A+ area image from the r+ image and the t+ image, an A− area image from the r− image and the t+ image, a B+ area image from the r+ image and the t− image, and a B− area image from the r− image and the t− image.

Figures 25, 26:
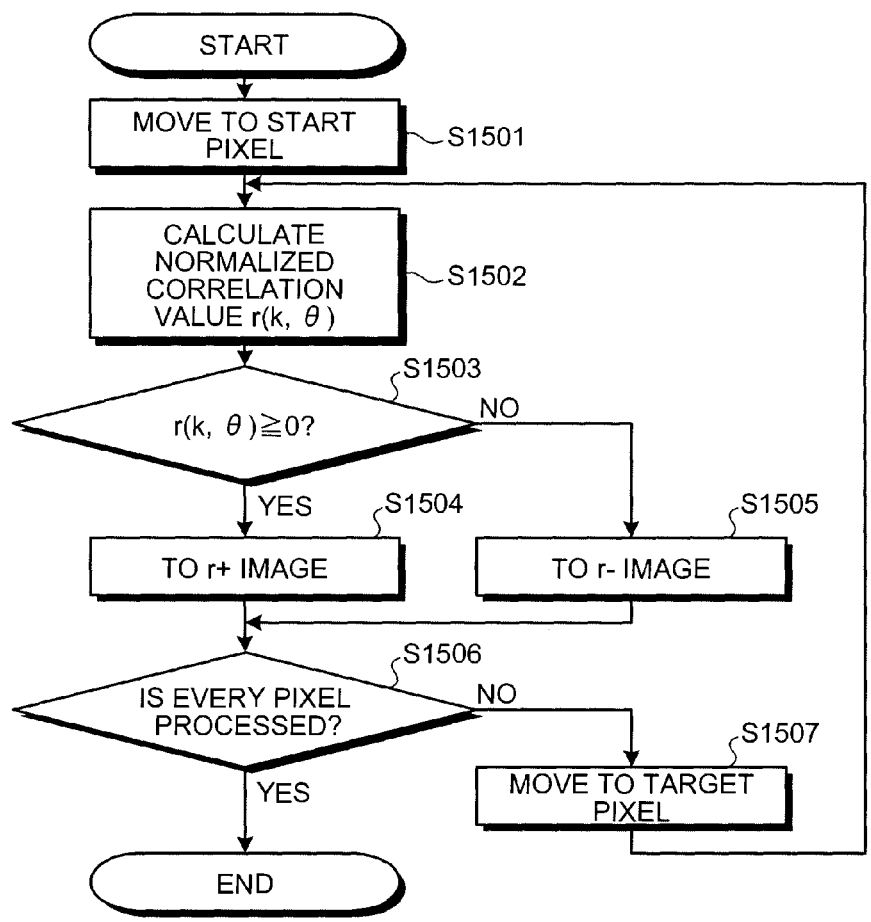
FIG. 25 is a schematic diagram for explaining each area image according to the second embodiment.
FIG. 26 is a flowchart of a normalized-correlation-value positive-negative separating process according to the second embodiment.

The meanings of the area images are as follows. FIG. 25 is a schematic diagram for explaining the four areas. As shown in the figure, the A+ area image is an area image obtained by superposing the r+ image and the t+ image, indicating that there is a correlation with the edge portions, which means that an edge comes out in a right place where the edge should come out, corresponding to a positive feature area image in the claims. The A− area image an area image obtained by superposing the r− image and the t+ image, indicating that there is no correlation with the edge portions, which means that an edge does not come out in the right place where the edge should come out, corresponding to a negative feature area image in the claims. The B+ area image is an area image obtained by superposing the r+ image and the t− image, indicating that there is a correlation with the background portions, which means that an edge does not come out in a wrong place where the edge should not come out, corresponding to a positive background area image in the claims. The B− area image is an area image obtained by superposing the r− image and the t− image, indicating that there is no correlation with the background portions, which means that an edge comes out in the wrong place where the edge should not come out, corresponding to a negative background area image in the claims.

Referring back to FIG. 19, the expansion processing unit 330 will be explained. The expansion processing unit 330 moves pixels of the A− area image to the A+ area image, and moves pixels of the B− area image to the B+ area image, by using a predetermined image mask. The expansion process is performed because a noise-like isolated point having a negative correlation value appears in the normalized correlation value. In other words, by performing the expansion process, it is possible to suppress an influence of the isolated point from affecting a result of determination of the verification value.

The verification-value calculating unit 340 divides each of the A+ area image, A− area image, B+ area image, and the B− area image into 16 blocks of horizontal 4 blocks and vertical 4 blocks, and calculates a verification value (Z) by using

[Numerical Expression 10]

$$Z = \sum_{j=0}^{3} \sum_{i=0}^{15} (a_{ij}A_{ij}^+ + b_{ij}A_{ij}^- + c_{ij}B_{ij}^+ + d_{ij}B_{ij}^-) \quad (13)$$

For coefficients $a_{ij}$, $b_{ij}$, $c_{ij}$, and $d_{ij}$, optimum values are obtained by a linear discriminant analysis using a learning sample. Each of block values of the area images $A^+_{ij}$, $A^-_{ij}$, $B^+_{ij}$, and $B^-_{ij}$ indicates a total sum of pixel values in each corresponding block.

The verification-value calculating unit 340 determines that a coin corresponding to the input image 233 is an authentic coin if the verification value (Z) is equal to or larger than a threshold, otherwise, determines that the coin is a counterfeit coin, and outputs a result of the determination.

A process of the positive-negative-separated-correlation determining unit 300 shown in FIG. 19 will be explained in detail. First, a normalized-correlation-value positive-negative separating process performed by the normalized-correlation-value calculating unit 310 will be explained with reference to FIGS. 26 and 29. FIG. 26 is a flowchart of the normalized-correlation-value positive-negative separating process, and FIG. 29 is a schematic diagram for explaining an image generation procedure in the positive-negative-separated-correlation determining unit 300.

Figure 29:
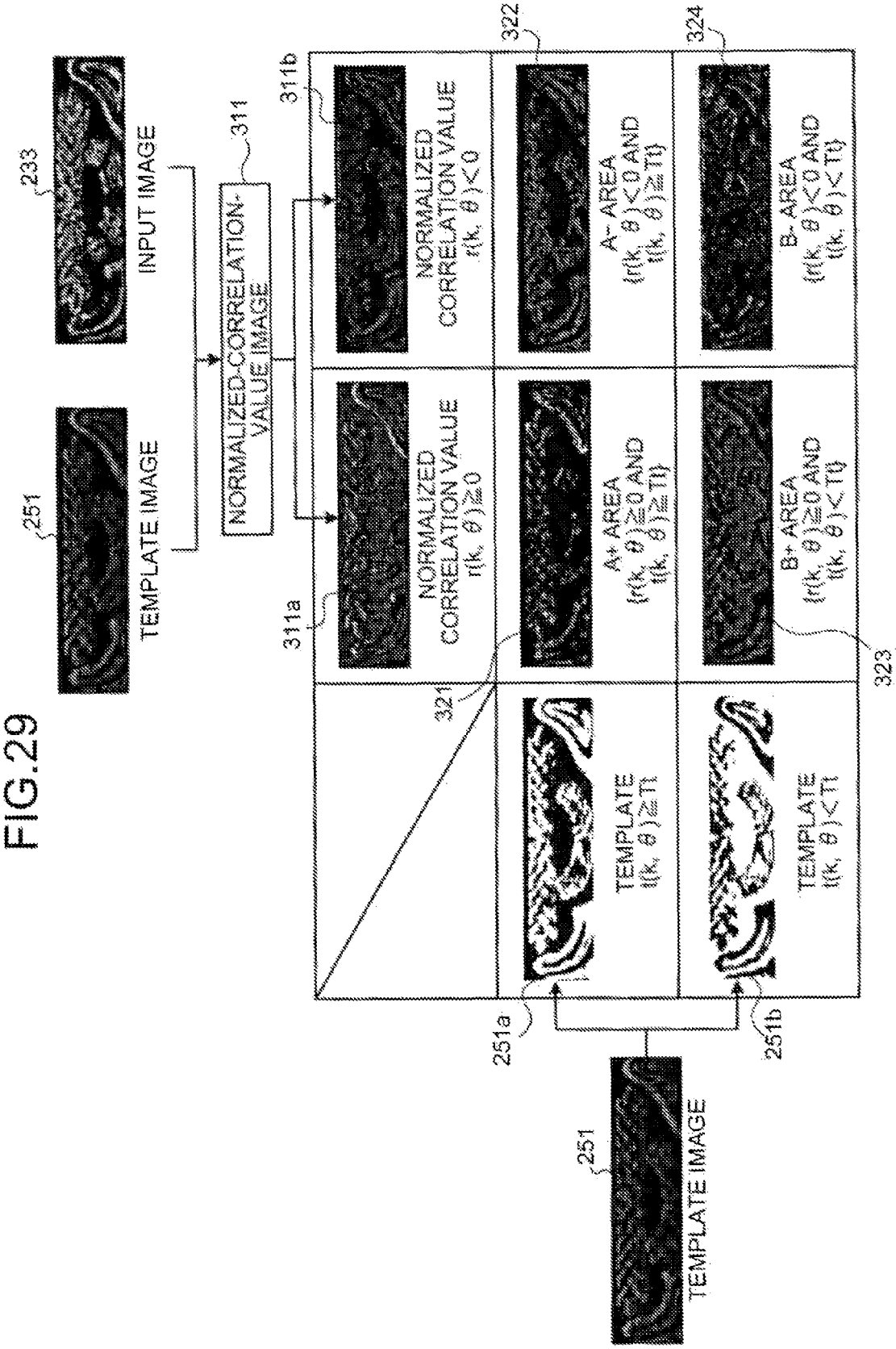
FIG. 29 is a schematic diagram for explaining an image generation procedure corresponding to each area shown in FIG. 25.

As shown in FIG. 29, the normalized-correlation-value calculating unit 310 generates a normalized-correlation-value image 311 from the input image 233 and the template image 251. After that, the normalized-correlation-value calculating unit 310 performs the normalized-correlation-value positive-negative separating process using generated normalized-correlation-value image 311 as an input, and separates the normalized-correlation-value image 311 into an r+ image 311a that is a positive-correlation-value image and an r− image 311b that is a negative-correlation-value image.

As shown in FIG. 26, in the normalized-correlation-value positive-negative separating process, the process first moves to a start pixel of the normalized-correlation-value image 311 (step S1501). The start pixel is, for example, a pixel of k=0 and θ=0. Then, the normalized correlation value r(k, θ) of the pixel is calculated by Equation (12) (step S1502), and if calculated r(k, θ) is equal to or larger than "0" (Yes at step S1503), the pixel value is set to a pixel value of the same coordinates as the r+ image 311a (step S1504). On the other hand, if the calculated r(k, θ) is smaller than "0" (No at step S1503), an absolute value of the pixel value is set to a pixel value of the same coordinates as the r− image 311b (step S1505).

When the positive-negative separating process is not completed for all of the pixels of the normalized-correlation-value image 311 (No at step S1506), the process moves to the next target pixel (step S1507), and the processes from the step S1502 are repeated. On the other hand, when the positive-negative separating process is completed for all of the pixels (Yes at step S1506), the process is terminated. In the normalized-correlation-value positive-negative separating process, each of the r+ image 311a and the r− image 311b is generated as an image having a pixel value in a range of 0.0 to 1.0. Although the pixel value of the r− image 111b is explained to have the pixel value in the range of 0.0 to 1.0 in the second embodiment, the pixel value can take a value in a range of −1.0 to 0.0.

Figure 27:
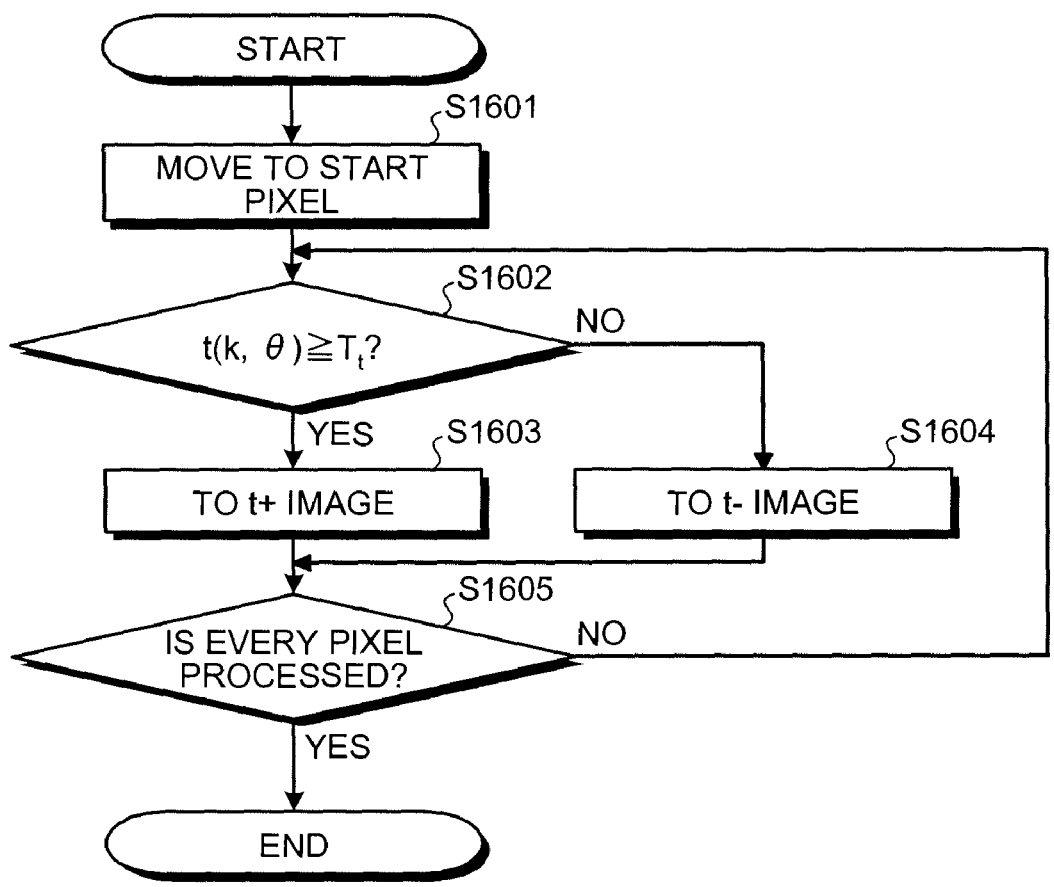
FIG. 27 is a flowchart of a template-image positive-negative separating process according to the second embodiment.

A template-image positive-negative separating process performed by the normalized-correlation-value calculating unit 310 will be explained with reference to FIGS. 27 and 29. FIG. 27 is a flowchart of the template-image positive-negative separating process. As shown in FIG. 29, in the template-image positive-negative separating process, the template image 251 is separated into a t+ image 251a that is a positive template image and a t− image 251b that is a negative template image.

As shown in FIG. 27, in the template-image positive-negative separating process, the process first moves to a start pixel of the template image 251 (step S1601). The start pixel is, for example, a pixel of k=0 and θ=0. Then, if a tone value of the pixel is equal to or larger than the threshold ($T_t$) (Yes at step S1602), a pixel value of the same coordinates as the t+ image 251a is set to "1" (step S1603). On the other hand, if the tone value is smaller than the threshold ($T_t$) (No at step S1602), a pixel value of the same coordinates as the t− image 251b is set to "1" (step S1604)

When the positive-negative separating process is not completed for all of the pixels of the template image 251 (No at step S1605), the process moves to the next target pixel (step S1606), and the processes from the step S1602 are repeated. On the other hand, when the positive-negative separating process is completed for all of the pixels (Yes at step S1605), the process is terminated. By the template-image positive-negative separating process, the t+ image 251a is generated as a binary image with the edge portion set to "1" and the background portion set to "0", and the t− image 251b is generated as a binary image with the edge portion set to "0" and the background portion set to "1".

Figure 28:
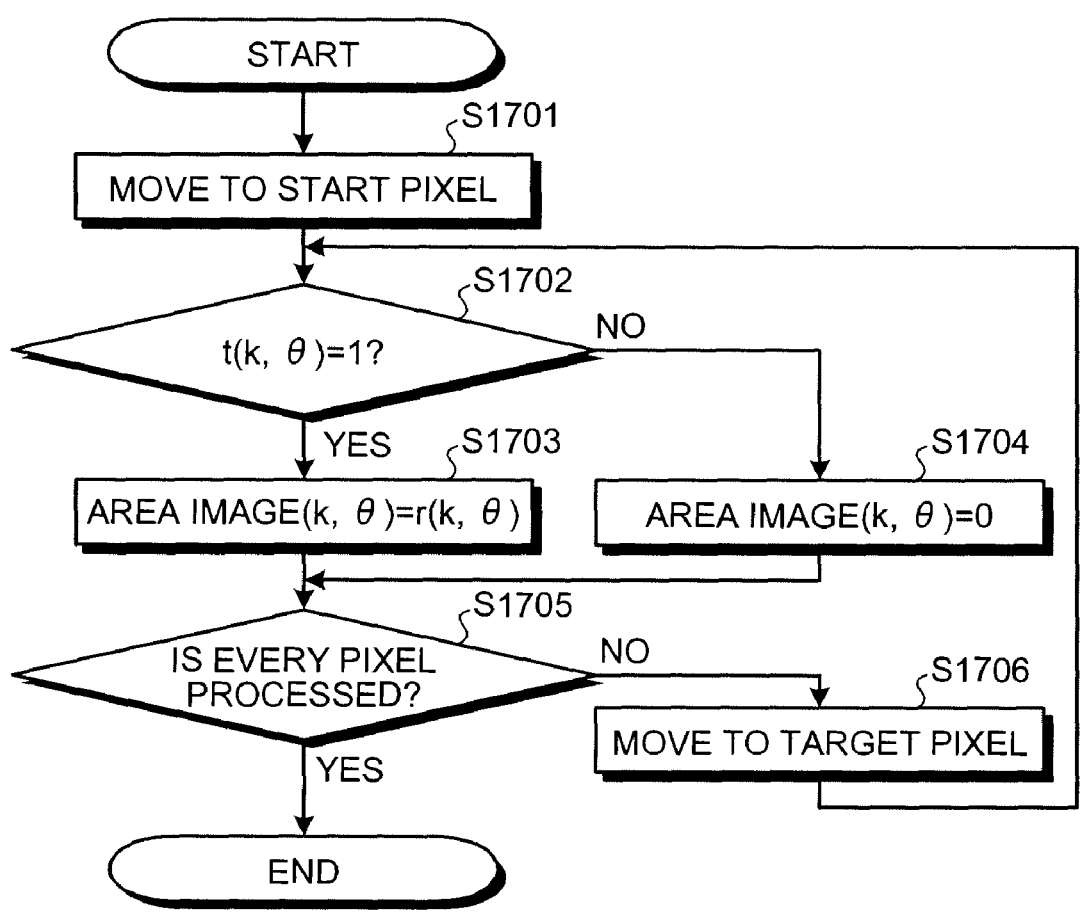
FIG. 28 is a flowchart of a processing procedure of the positive-negative-separated-correlation-image generating unit according to the second embodiment.

A positive-negative-separated-correlation-image generating process performed by the positive-negative-separated-correlation-image generating unit 320 will be explained with reference to FIGS. 28 and 29. FIG. 28 is a flowchart of the positive-negative-separated-correlation-image generating process.

As shown in FIG. 29, in the positive-negative-separated-correlation-image generating process, an A+ area image 321, an A− area image 322, a B+ area image 323, and a B− area image 324 are generated using the r+ image 311a, the r− image 311b, the t+ image 251a, and the t− image 251b generated by the normalized-correlation-value calculating unit 310, as an input image.

For instance, when the r+ image 311a and the t+ image 251a are used as the input image, as shown in FIG. 28, the process first moves to a start pixel of each of the images (step S1701). If the pixel value of the t+ image 251a in the pixel is "1" (Yes at step S1702), the pixel value of the A+ area image 321 is set to the pixel value of the r+ image 311a (step S1703). On the other hand, if the pixel value of the t+ image 251a in the pixel is not "1" (in other words, the pixel value is "0") (No at step S1702), the pixel value of the A+ area image 321 is set to "0" (step S1704).

When the area-image generating process is not completed for all of the pixels (No at step S1705), the process moves to the next target pixel (step S1706), and the processes from the step S1702 are repeated. On the other hand, when the area-image generating process is completed for all of the pixels (Yes at step S1705), the process is terminated because the A+ area image 321 is generated.

In the same way, the A− area image 322 is generated from the r− image 311b and the t+ image 251a, the B+ area image 323 is generated from the r+ image 311a and the t− image 251b, and the B− area image 324 is generated from the r− image 311b and the t− image 251b.

Figure 31:
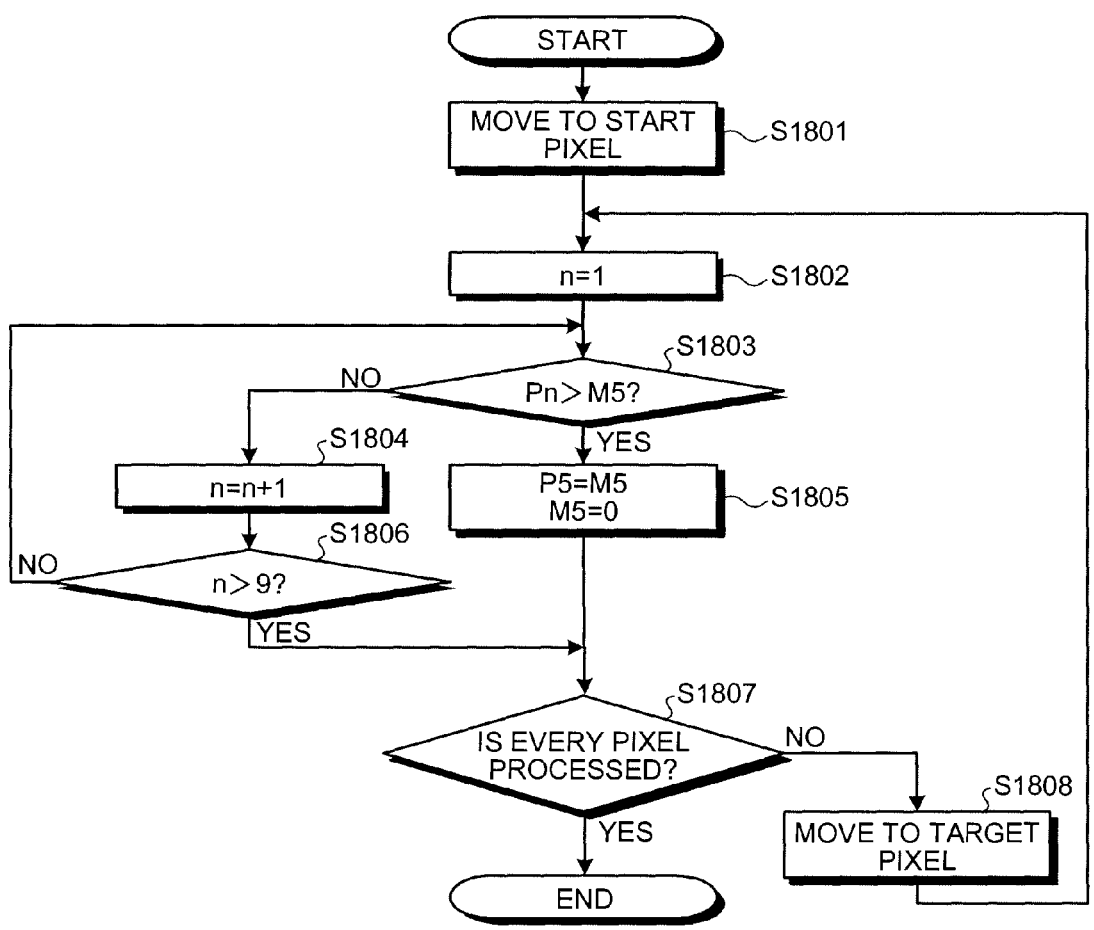
FIG. 31 is a flowchart of a processing procedure of the expansion processing unit according to the second embodiment.
Figure 32:
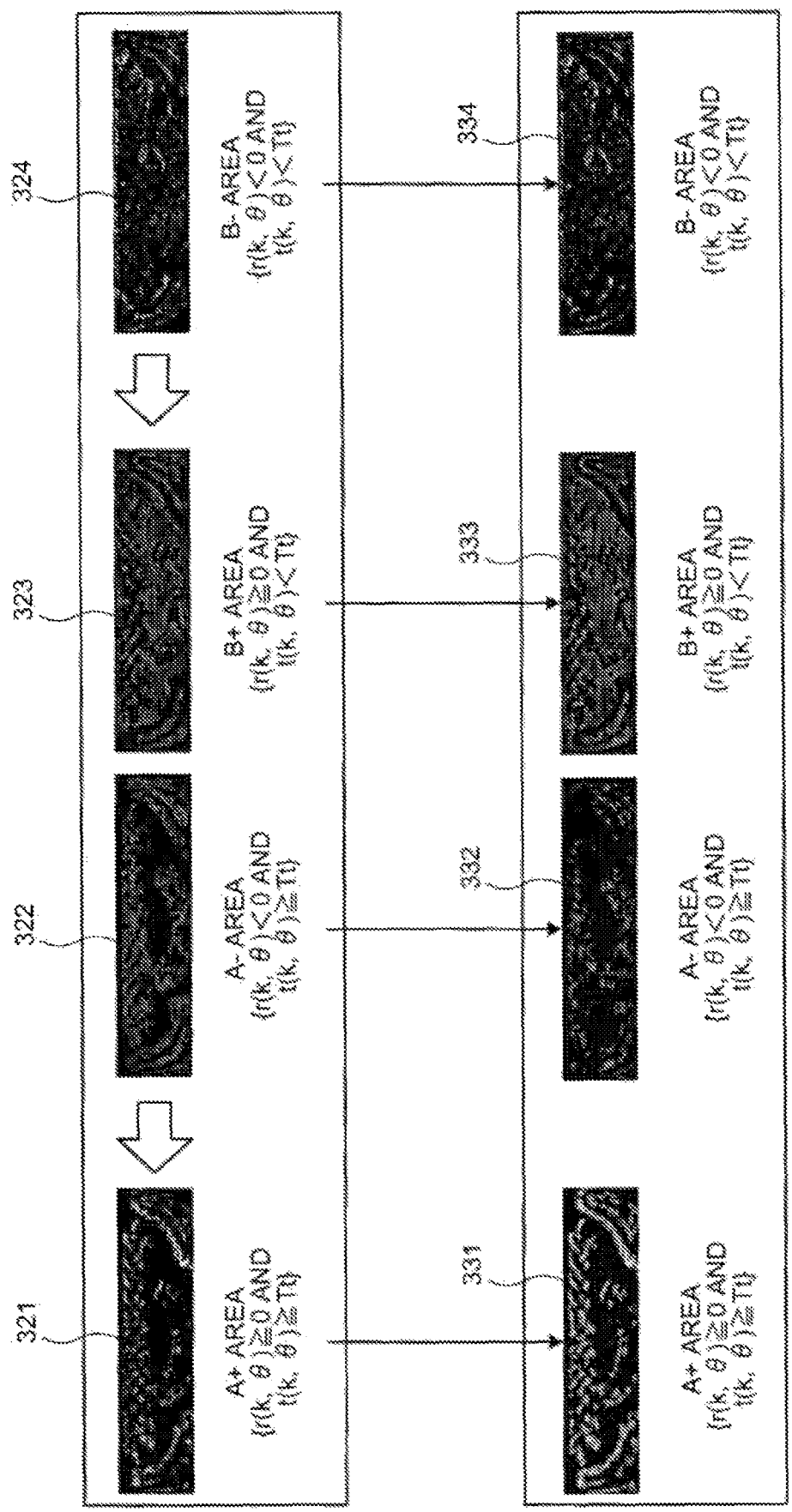
FIG. 32 is a schematic diagram for explaining an image generated by the expansion processing unit according to the second embodiment.

The expansion process performed by the expansion processing unit 330 will be explained with reference to FIGS. 30 to 32. FIG. 30 is a schematic diagram for explaining an image mask used in the expansion process, FIG. 31 is a flowchart of the expansion process, and FIG. 32 is a schematic diagram for explaining an image generated by the expansion process.

In the expansion process, the noise-like isolated point (pixel) included in a negative area image (the A− area image 322 and the B− area image 324) is moved to a positive area image (the A+ area image 321 and the B+ area image 323). By performing the above process, it is possible to enhance the precision of the verification value.

As shown in FIG. 30, in the expansion process, two image masks, a positive-area image mask 330a and a negative-area image mask 330b, are used. The positive-area image mask 330a and the negative-area image mask 330b include a P5 and an M5 with eight areas surrounding the P5 and the M5, respectively. For instance, when performing the expansion process from the A− area image 322 to the A+ area image 321, the M5 of the negative-area image mask 330b is set to a target pixel of the A− area image 322, and the P5 of the positive-area image mask 330a is set to a pixel corresponding to the target pixel. After that, the expansion process is performed by sequentially comparing the pixel value of the M5 with pixel values of P1 to P9.

A processing procedure of the expansion process will be explained with a case in which the expansion process is performed from the A− area image 322 to the A+ area image 321, with reference to FIG. 31. The process first moves to a start pixel of each of the images (321 and 322) (step S1801). The start pixel is, for example, a pixel of k=0 and θ=0. Then, "1" is set to "n" for sequentially switching the nine areas of the positive-area image mask 330a (P1 to P9) (step S1802). Namely, at the time of completing the step S1802, the target area of the positive-area image mask 330a is the P1.

The value of the Pn is compared with the value of the M5, and if the value of the P1 is larger than the value of the M5 (Yes at step S1803), the value of the P5 is replaced by the value of the M5 and "0" is set to the value of the M5 (step S1805). In other words, the pixel of the M5 is moved to the pixel of the P5. On the other hand, if the value of the Pn is equal to or smaller than the value of the M5 (No at step S1803), "1" is added to the value of "n" (step S1804), and if the value of "n" is equal to or smaller than "9" (No at step S1806), the step S1803 is performed again.

In this manner, if any one of the P1 to P9 is larger than the M5, the pixel of the M5 is moved to the pixel of the P5. On the other hand, if values of all of the P1 to P9 are equal to or smaller than the value of the M5 (Yes at step S1806), the movement of the pixel is not performed.

When the process is not completed for all of the pixels of the A− area image 322 (No at step S1807), the process moves to the next target pixel (step S1808), to perform the processes after the step S1802. On the other hand, when the process is completed for all of the pixels of the A− area image 322 (Yes at step S1807), the expansion process is terminated.

As shown in FIG. 32, by the expansion process, the A+ area image 321, the A− area image 322, the B+ area image 323, and the B− area image 324 are converted into an expanded A+ area image 331, an expanded A− area image 332, an expanded B+ area image 333, and an expanded B− area image 334, respectively. Because the isolated point on the A− area image 322 is moved to the A+ area image 321, a dimension of the edge portion of the expanded A+ area image 331 is increased, compared to the A+ area image 321. On the other hand, a dimension of the edge portion of the expanded A− area image 332 is decreased, compared to the A− area image 322.

Figure 33:
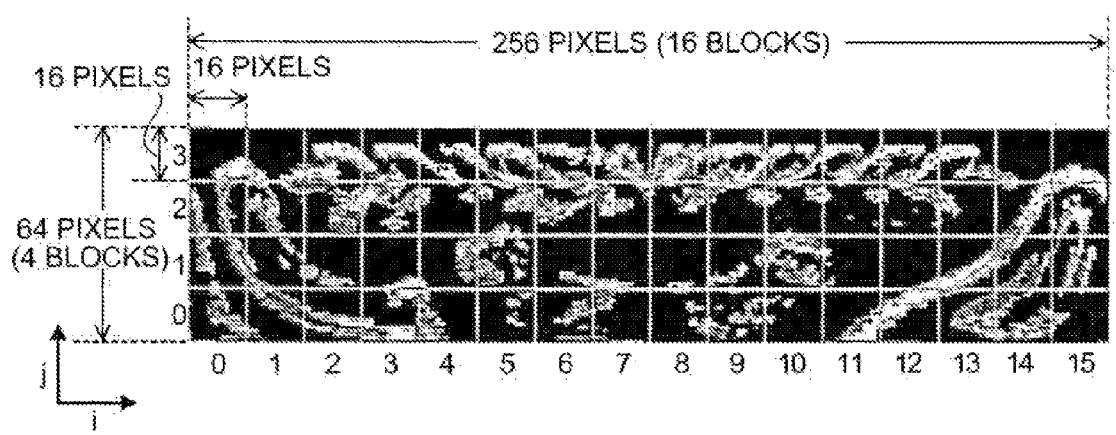
FIG. 33 is a schematic diagram for explaining a block segmentation of an image used in a verification-value calculating unit according to the second embodiment.

A verification-value calculating process performed by the verification-value calculating unit 340 will be explained with reference to FIG. 33. FIG. 33 is a schematic diagram for explaining an example of a block segmentation of the expanded area images (331 to 334) with a case of block segmenting the expanded A+ area image 331. As shown in the figure, the verification-value calculating unit 340 first segments the expanded A+ area image 331 into 64 blocks of horizontal 16 blocks and vertical 4 blocks, and in the same way, performs the block segmentation for the expanded A− area image 332, the expanded B+ area image 333, and the expanded B− area image 334.

After that, the verification-value calculating unit 340 calculates the verification value (Z) by using Equation (13). For coefficients $a_{ij}$, $b_{ij}$, $c_{ij}$, and $d_{ij}$ in Equation (13), optimum values are obtained by a linear discriminant analysis using a learning sample. Specifically, the coefficients take different values for different types of the coins, because there are coins from which the edge easily comes out and coins from which the edge hardly comes out due to a difference of the relief pattern of the coin. By optimizing the coefficients with the learning sample, it is possible to perform the image verification with high precision.

The verification-value calculating unit 340 calculates the verification value (Z) by using the coefficients $a_{ij}$, $b_{ij}$, $c_{ij}$, and $d_{ij}$ for which the optimum values are set and each of the blocks, determines that the coin is an authentic coin if the verification value is equal to or larger than a threshold, and determines that the coin is a counterfeit coin if the verification value is smaller than the threshold. Although a case in which the image is segmented into the 64 blocks is explained in the second embodiment, the number of blocks can be set to an arbitrary number.

In addition, if the coefficients $c_{ij}$ and $d_{ij}$ are set to "0" in Equation (13), the verification value (Z) can be calculated only from the A+ area image block and the A− area image block. On the other hand, if the coefficients $a_{ij}$ and $b_{ij}$, $c_{ij}$ are set to "0", the verification value (Z) can be calculated only from the B+ area image block and the B− area image block.

In this manner, the verification-value calculating unit 340 can efficiently perform the image verification by adjusting the number of image blocks and values of the coefficients in Equation (13) according to the type of the coin or a performance of hardware.

Although, in the verification-value calculating unit 340 according to the second embodiment, the verification value (Z) is calculated by Equation (13) after block segmenting each of the area images, the configuration is not limited to the above scheme, but can be configured in such a manner that the verification determination is performed by other method. For instance, other methods, such as a multilayer neural network, a support vector machine, and a secondary discriminant function, can be employed.

Figure 34:
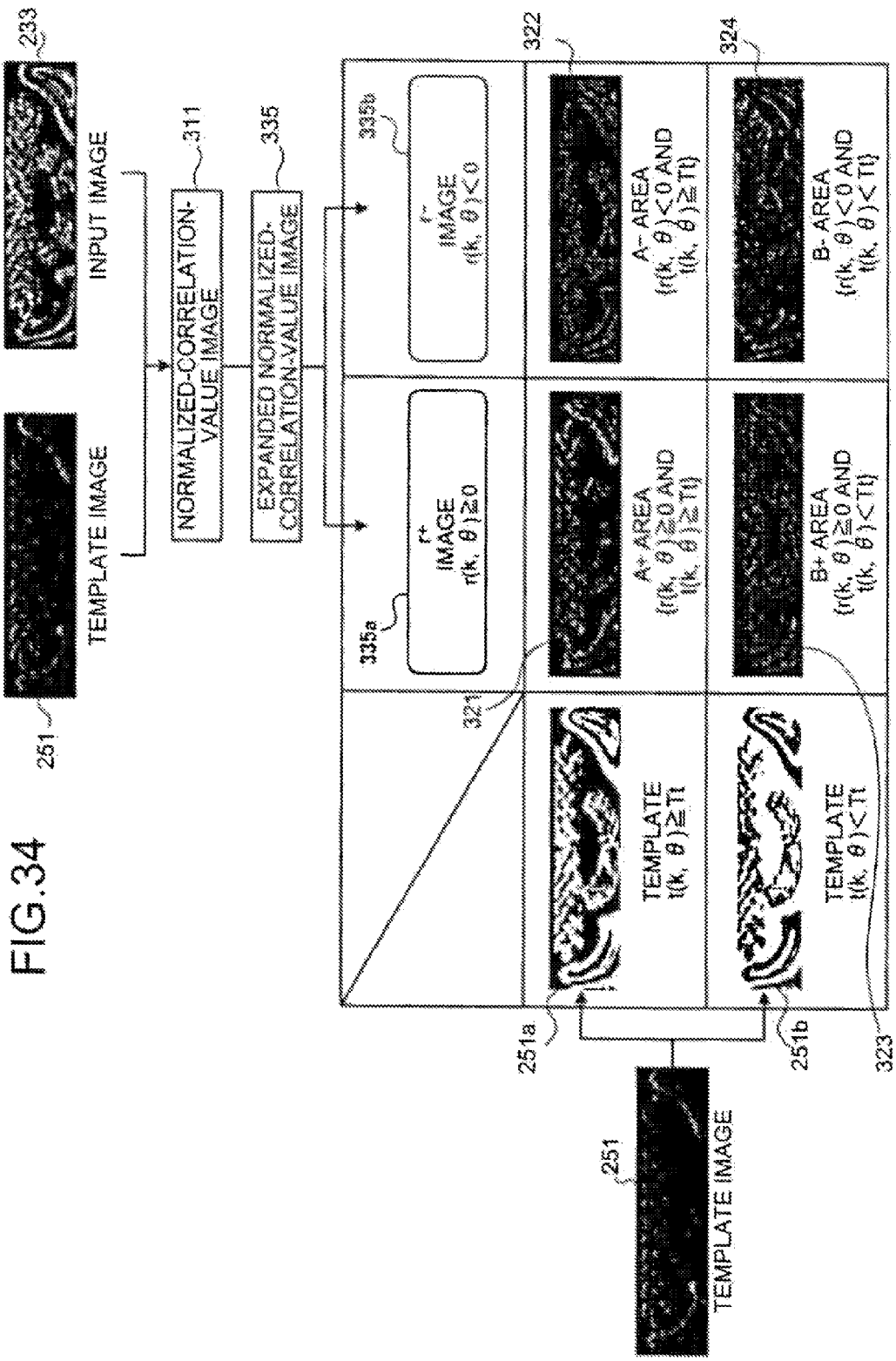
FIG. 34 is a schematic diagram for explaining a modification example of an expansion process according to the second embodiment.
Figure 36:
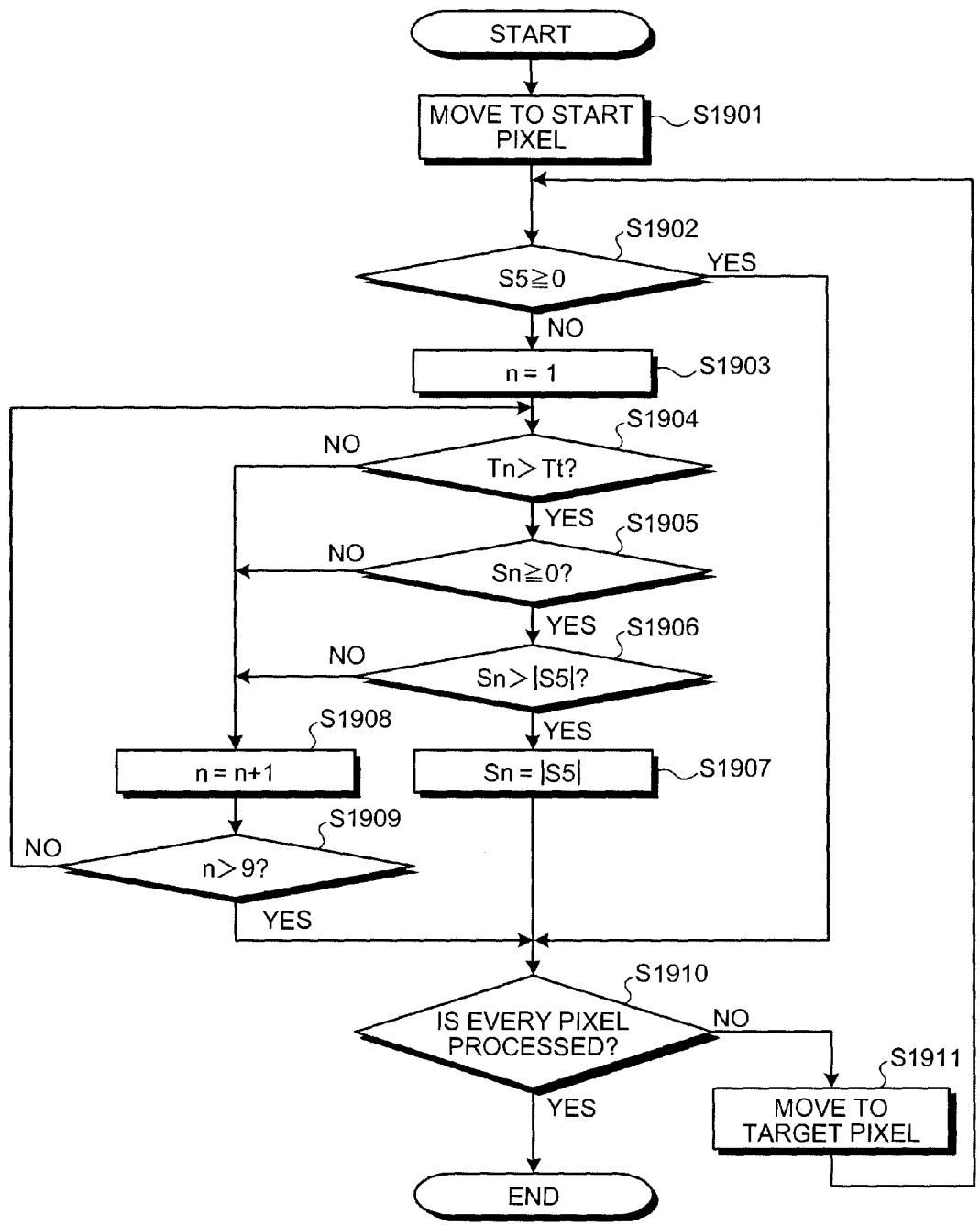
FIG. 36 is a flowchart of a processing procedure of an expansion processing unit according to the modification example shown in FIG. 34.

A case in which the expansion process is performed before positive-negative separating the normalized-correlation-value image 311 will be explained with reference to FIGS. 34 to 36. FIG. 34 is a schematic diagram for explaining an image generating procedure by the expansion process, FIG. 35 is a schematic diagram for explaining an image mask used in the expansion process, and FIG. 36 is a flowchart of the expansion process.

In the above-described expansion process, the pixel is moved from the negative area image (for example, the A− area image 322) to the positive area image (for example, the A+ area image 321) after generating each of the area images (321 to 324). However, the expansion process can be performed using the normalized-correlation-value image 311 before the positive-negative separation and the template image 251 before the positive-negative separation.

As shown in FIG. 34, the normalized-correlation-value calculating unit 310 first generates the normalized-correlation-value image 311 from the input image 233 and the template image 251. Then, the expansion process is performed by using generated normalized-correlation-value image 311 as an input, to generate an expanded normalized-correlation-value image 335. The expanded normalized-correlation-value image 335 is separated into an expanded r+ image 335*a* and an expanded r− image 335*b*. Subsequently, a process of the positive-negative-separated-correlation-image generating unit 320 is performed by using the expanded r+ image 335*a*, the expanded r− image 335*b*, the t+ image 251*a* and the t− image 251*b* as an input, and the expanded A+ area image 331, the expanded A− area image 332, the expanded B+ area image 333, and the expanded B− area image 334 are output.

As shown in FIG. 35, in the expansion process, two image masks, an input image mask 330*c* and a template image mask 330*d*, are used. The input image mask 330*c* and the template image mask 330*d* include S5 and T5 with eight areas surrounding S5 and T5, respectively. For instance, when performing the expansion process by using the template image 251 and the normalized-correlation-value image 311, S5 of the input image mask 330*c* is set to a target pixel of the normalized-correlation-value image, and T5 of the template image mask 330*d* is set to a pixel corresponding to the target pixel. After that, the expansion process is performed by comparing pixel values of areas of S1 to S9 and T1 to T9.

A processing procedure of the expansion process will be explained with reference to FIG. 36. The process first moves to a start pixel of each of the images (311 and 251) (step S1901). The start pixel is, for example, a pixel of k=0 and θ=0. If the value of S5 is negative, in other words, if the normalized correlation value of the pixel is negative (No at step S1902), "1" is set to "n" for sequentially switching the nine areas (S1 to S9) of the input image mask 330*c* and the nine areas (T1 to T9) of the template image mask 330*d* (step S1903).

If the value of Tn is larger than the threshold ($T_t$) (Yes at step S1904), it is determined whether the value of S5 is equal to or larger than "0" (step S1905), and if the value of Sn is equal to or larger than "0" (yes at step S1905), the value of Sn is compared with an absolute value of S5 (step S1906). If the value of Sn is larger than the absolute value of S5 (Yes at step S1906), the value of Sn is replaced by the absolute value of S5 (step S1907).

In other words, when there is an area (Sn) in which the value of Tn is larger than the threshold ($T_t$), the value of Sn is equal to or larger thank "0", and the value of Sn is larger than the absolute value of Sn in the areas Sn around S5, the pixel of S5 is determined to be an isolated point, and the value of S5 is inverted with the absolute value of S5. Then, if the expansion process is not completed for all of the pixels of the normalized-correlation-value image 311 (No at step S1910), the process moves to the target pixel (step S1911), and the processes from the step S902 are repeated. On the other hand, when the expansion process is completed for all of the pixels (Yes at step S1910), the expansion process is terminated.

On the other hand, if the value of Tn is equal to or smaller than the threshold ($T_t$) (No at step S1904), the value of Sn is negative (No at step S1905), or the value of Sn is equal to or smaller than the absolute value of S5 (No at step S1906), "1" is added to the value of "n" (step S1908), and if the value of "n" is equal to or smaller than "9" (No at step S1909), the processes from the step S1904 are repeated. On the other hand, if the value of "n" is larger than "9" (Yes at step S1909), the process of the step S1910 is performed.

In this manner, even when the expansion process is performed before positive-negative separating the normalized-correlation-value image 311, it is possible to obtain the expanded area images (331 to 334). In this case, because the normalized-correlation-value image 311 before the positive-negative separation is used, the number of images for the expansion process can be reduced, compared to the expansion process after generating the area images (321 to 324), and it is possible to perform the expansion process more efficiently.

As described above, in the image verifying apparatus, the image verifying method, and the image verifying program according to the second embodiment, a polar-coordinates-converted input image on which the feature extraction is performed by executing the edge extracting process and the edge normalizing process is matched with a polar-coordinates-converted template image on which the edge normalizing process is performed in advance, and the normalized-correlation-value image is generated by compensating a deviation angle between the images. The normalized-correlation-value image is separated into a positive-normalizedcorrelation-value image and a negative-normalized-correlation-value image, and the template image is separated into a positive template image and a negative template image, depending on whether the pixel value in each of the images is equal to or larger than a threshold, and by combining the images, a positive feature area image, a negative feature area image, a positive background area image and a negative background area image are generated. Furthermore, an expansion process is performed in which a movement of a pixel from the negative feature area image to the positive feature area image and a movement of a pixel from the negative background area image to the positive background area image are performed, and a verification determination is performed by calculating a verification value by the linear discriminant analysis by block segmenting the expanded area images. Therefore, it is possible to take all of the pixels of the input image and the template image as a target of the verification, and to reflect not only the correlation value of the feature area but also the correlation value of the background area on the verification value in a well-balanced manner, while removing an influence of the isolated point accompanied by the calculation of the correlation value. As a result, an image verification with a high precision can be performed, and it is possible to enhance the verification rate of the image.

Although, a case in which the image verification is performed for an input image of a coin is explained in the second embodiment, the present invention is not limited to the above scheme, but can be applied to, for example, an image verification of a medal used in play facilities or an image verification of a circular part or a circular product in a factory automation (FA) process. Furthermore, the object to be verified is not necessarily to be circular, but the present invention can be applied to a coin or a part having a point symmetry shape such as an equilateral octagon and an equilateral 16-sided polygon.

INDUSTRIAL APPLICABILITY

As describe above, an image verifying apparatus, an image verifying method, and an image verifying program according to the present invention are suitable for an image verification of an article, and more particularly, suitable for a verification of a currency, such as a paper currency and a coin.

The invention claimed is:

1. An image verifying apparatus that verifies an image by comparing features of images between an input image of an object to be verified and a template image registered in advance, the image verifying apparatus comprising:
a correlation-value-image separating unit that generates, with a computer, a correlation value image from the input image and the template image, and separates the correlation value image into a positive correlation value image and a negative correlation value image depending on whether a pixel value of the correlation value image is equal to or larger than a threshold;
a template-image separating unit that separates the template image into a positive template image and a negative template image depending on whether a pixel value of the template image is equal to or larger than a threshold;
a positive-negative-separated-correlation-image generating unit that generates a plurality of positive-negative-separated correlation-images having, as a pixel value of the plurality of the positive-negative-separated correlation-images, a value obtained by calculating a product of a pixel value of one of the positive correlation value image and the negative correlation value image and a pixel value of one of the positive template image and the negative template image; and
a verification determining unit that performs a verification determination based on the positive-negative-separated correlation images.

2. The image verifying apparatus according to claim 1, wherein the positive-negative-separated-correlation-image generating unit generates a positive feature area image and a negative feature area image, the positive feature area image taking a value obtained by calculating a product of the positive correlation value image and the positive template image for each pixel as a pixel value, the negative feature area image taking a value obtained by calculating a product of the negative correlation value image and the positive template image for each pixel as a pixel value.

3. The image verifying apparatus according to claim 2, wherein the positive-negative-separated-correlation-image generating unit compares a target pixel in a negative area image generated by using the negative correlation value image with neighboring pixels surrounding a pixel corresponding to the target pixel in a positive area image generated by using the positive correlation value image, and when a pixel value of at least one of the neighboring pixels is larger than a pixel value of the target pixel, performs an expansion process of moving the target pixel to the pixel corresponding to the target pixel.

4. The image verifying apparatus according to claim 1, wherein the positive-negative-separated-correlation-image generating unit generates a positive background area image and a negative background area image, the positive background area image taking a value obtained by calculating a product of the positive correlation value image and the negative template image for each pixel as a pixel value, the negative background area image taking a value obtained by calculating a product of the negative correlation value image and the negative template image for each pixel as a pixel value.

5. The image verifying apparatus according to claim 4, wherein the positive-negative-separated-correlation-image generating unit compares a target pixel in a negative area image generated by using the negative correlation value image with neighboring pixels surrounding a pixel corresponding to the target pixel in a positive area image generated by using the positive correlation value image, and when a pixel value of at least one of the neighboring pixels is larger than a pixel value of the target pixel, performs an expansion process of moving the target pixel to the pixel corresponding to the target pixel.

6. The image verifying apparatus according to claim 1, wherein the positive-negative-separated-correlation-image generating unit generates a positive feature area image, a negative feature area image, a positive background area image, and a negative background area image, the positive feature area image taking a value obtained by calculating a product of the positive correlation value image and the positive template image for each pixel as a pixel value, the negative feature area image taking a value obtained by calculating a product of the negative correlation value image and the positive template image for each pixel as a pixel value, the positive background area image taking a value obtained by calculating a product of the positive correlation value image and the negative template image for each pixel as a pixel value, the negative background area image taking a value obtained by calculating a product of the negative correlation value image and the negative template image for each pixel as a pixel value.

7. The image verifying apparatus according to claim 6, wherein the positive-negative-separated-correlation-image generating unit compares a target pixel in a negative area image generated by using the negative correlation value image with neighboring pixels surrounding a pixel corresponding to the target pixel in a positive area image generated by using the positive correlation value image, and when a pixel value of at least one of the neighboring pixels is larger than a pixel value of the target pixel, performs an expansion process of moving the target pixel to the pixel corresponding to the target pixel.

8. The image verifying apparatus according to claim 1, wherein each of the input image and the template image is an edge image obtained by an image conversion by an edge extracting process employing an edge extraction operator.

9. The image verifying apparatus according to claim 8, wherein the edge image is a normalized edge image obtained by normalizing an edge strength of extracted edge.

10. The image verifying apparatus according to claim 1, wherein the template image is an average image obtained by averaging individual images of the object to be verified.

11. The image verifying apparatus according to claim 1, wherein the correlation value image is an image having, as a pixel value of the correlation value image, a normalized correlation value obtained by normalizing a correlation value between corresponding pixels of the input image and the template image.

12. The image verifying apparatus according to claim 1, wherein the verification determining unit performs the verification determination by calculating a verification value by segmenting the positive-negative-separated correlation images into blocks, calculating a total sum of pixel values in each of the blocks as a block value, and adding a product of the block value and a weighting coefficient for all of the positive-negative-separated correlation-images.

13. The image verifying apparatus according to claim 12, wherein the verification determining unit calculates a value of the weighting coefficient by a linear discriminant analysis.

14. The image verifying apparatus according to claim 1, wherein the object to be verified is a currency.

15. The image verifying apparatus according to claim 1, wherein
the input image is that of a circular object,
the image verifying apparatus further comprises a polar-coordinates-converted-image generating unit that performs a polar-coordinates conversion of the input image and the template image, and generates a $\rho$-$\theta$ input image and a $\rho$-$\theta$ template image for which a deviation of rotation between the input image and the template image has been compensated;
the correlation-value-image separating unit generates the correlation value image from the $\rho$-$\theta$ input image and the $\rho$-$\theta$ template image, and
the template-image separating unit uses the $\rho$-$\theta$ template image for separation.

16. The image verifying apparatus according to claim 15, wherein the positive-negative-separated-correlation-image generating unit generates a positive feature area image and a negative feature area image, the positive feature area image taking a value obtained by calculating a product of the positive correlation value image and the positive template image for each pixel as a pixel value, the negative feature area image taking a value obtained by calculating a product of the negative correlation value image and the positive template image for each pixel as a pixel value.

17. The image verifying apparatus according to claim 16, wherein the positive-negative-separated-correlation-image generating unit compares a target pixel in a negative area image generated by using the negative correlation value image with neighboring pixels surrounding a pixel corresponding to the target pixel in a positive area image generated by using the positive correlation value image, and when a pixel value of at least one of the neighboring pixels is larger than a pixel value of the target pixel, performs an expansion process of moving the target pixel to the pixel corresponding to the target pixel.

18. The image verifying apparatus according to claim 15, wherein the positive-negative-separated-correlation-image generating unit generates a positive background area image and a negative background area image, the positive background area image taking a value obtained by calculating a product of the positive correlation value image and the negative template image for each pixel as a pixel value, the negative background area image taking a value obtained by calculating a product of the negative correlation value image and the negative template image for each pixel as a pixel value.

19. The image verifying apparatus according to claim 18, wherein the positive-negative-separated-correlation-image generating unit compares a target pixel in a negative area image generated by using the negative correlation value image with neighboring pixels surrounding a pixel corresponding to the target pixel in a positive area image generated by using the positive correlation value image, and when a pixel value of at least one of the neighboring pixels is larger than a pixel value of the target pixel, performs an expansion process of moving the target pixel to the pixel corresponding to the target pixel.

20. The image verifying apparatus according to claim 15, wherein the positive-negative-separated-correlation-image generating unit generates a positive feature area image, a negative feature area image, a positive background area image, and a negative background area image, the positive feature area image taking a value obtained by calculating a product of the positive correlation value image and the positive template image for each pixel as a pixel value, the negative feature area image taking a value obtained by calculating a product of the negative correlation value image and the positive template image for each pixel as a pixel value, the positive background area image taking a value obtained by calculating a product of the positive correlation value image and the negative template image for each pixel as a pixel value, the negative background area image taking a value obtained by calculating a product of the negative correlation value image and the negative template image for each pixel as a pixel value.

21. The image verifying apparatus according to claim 20, wherein the positive-negative-separated-correlation-image generating unit compares a target pixel in a negative area image generated by using the negative correlation value image with neighboring pixels surrounding a pixel corresponding to the target pixel in a positive area image generated by using the positive correlation value image, and when a pixel value of at least one of the neighboring pixels is larger than a pixel value of the target pixel, performs an expansion process of moving the target pixel to the pixel corresponding to the target pixel.

22. The image verifying apparatus according to claim 15, wherein each of the $\rho$-$\theta$ input image and the $\rho$-$\theta$ template image is an edge image obtained by an image conversion by an edge extracting process employing an edge extraction operator.

23. The image verifying apparatus according to claim 22, wherein the edge image is a normalized edge image obtained by normalizing an edge strength of extracted edge.

24. The image verifying apparatus according to claim 15, wherein the template image is an average image obtained by averaging individual images of the object to be verified.

25. The image verifying apparatus according to claim 15, wherein the correlation value image is an image having, as a pixel value of the correlation value image, a normalized correlation value obtained by normalizing a correlation value between corresponding pixels of the ρ-θ input image and the ρ-θ template image.

26. The image verifying apparatus according to claim 15, wherein the verification determining unit performs the verification determination by calculating a verification value by segmenting the positive-negative-separated correlation images into blocks, calculating a total sum of pixel values in each of the blocks as a block value, and adding a product of the block value and a weighting coefficient for all of the positive-negative-separated correlation-images.

27. The image verifying apparatus according to claim 26, wherein the verification determining unit calculates a value of the weighting coefficient by a linear discriminant analysis.

28. The image verifying apparatus according to claim 15, wherein the polar-coordinates-converted-image generating unit compensates the deviation of rotation between the input image and the template image by performing a parallel shift of either one of the ρ-θ input image and the ρ-θ template image.

29. The image verifying apparatus according to claim 15, wherein the circular object is a coin.

30. An image verifying method of verifying an image by comparing features of images between an input image of an object to be verified and a template image registered in advance, the image verifying method comprising:

correlation-value-image separating by a correlation-value-image separating unit including
  generating, with a computer, a correlation value image from the input image and the template image; and
  separating the correlation value image into a positive correlation value image and a negative correlation value image depending on whether a pixel value of the correlation value image is equal to or larger than a threshold;

template-image separating by a template-image separating unit including
  separating the template image into a positive template image and a negative template image depending on whether a pixel value of the template image is equal to or larger than a threshold;

positive-negative-separated-correlation-image generating by a positive-negative-separated-correlation-image generating unit including
  generating a plurality of positive-negative-separated correlation-images having, as a pixel value of the plurality of the positive-negative-separated correlation-images, a value obtained by calculating a product of a pixel value of one of the positive correlation value image and the negative correlation value image and a pixel value of one of the positive template image and the negative template image; and verification determining by a verification determining unit including
  performing a verification determination based on the positive-negative-separated correlation-images.

31. The image verifying method according to claim 30, wherein
  the input image is that of a circular object,
  the image verifying method further comprises polar-coordinates-converted-image generating by a polar-coordinates-converted-image generating unit including
    performing a polar-coordinates conversion of the input image and the template image; and
    generating a ρ-θ input image and a ρ-θ template image for which a deviation of rotation between the input image and the template image has been compensated,
  the correlation-value-image separating includes generating the correlation value image from the ρ-θ input image and the ρ-θ template image, and
  the template-image separating includes using the ρ-θ template image for separation.

32. A non-transitory computer readable storage medium having stored therein an image verifying program for verifying an image by comparing features of images between an input image of an object to be verified and a template image registered in advance, the image verifying program causing a computer to execute the image verifying method according to claim 30.

33. A non-transitory computer readable storage medium having stored therein an image verifying program for verifying an image by comparing features of images between an input image of a circular object and a template image registered in advance, the image verifying program causing a computer to execute the image verifying method according to claim 31.

* * * * *